US012635696B2

(12) United States Patent
Ichimura et al.

(10) Patent No.: US 12,635,696 B2
(45) Date of Patent: May 26, 2026

(54) PUFFED FOOD

(71) Applicant: MEIJI CO., LTD., Tokyo (JP)

(72) Inventors: Takefumi Ichimura, Tokyo (JP);
Megumi Tada, Tokyo (JP)

(73) Assignee: MEIJI CO., LTD., Tokyo (JP)

( * ) Notice: Subject to any disclaimer, the term of this
patent is extended or adjusted under 35
U.S.C. 154(b) by 265 days.

(21) Appl. No.: 18/564,319

(22) PCT Filed: May 30, 2022

(86) PCT No.: PCT/JP2022/022015
§ 371 (c)(1),
(2) Date: Jan. 9, 2024

(87) PCT Pub. No.: WO2022/255324
PCT Pub. Date: Dec. 8, 2022

(65) Prior Publication Data
US 2024/0245062 A1      Jul. 25, 2024

(30) Foreign Application Priority Data

May 31, 2021    (JP) ................................. 2021-091984

(51) Int. Cl.
A21D 2/26        (2006.01)
A21D 2/18        (2006.01)
A21D 13/066      (2017.01)
(52) U.S. Cl.
CPC ............. A21D 2/263 (2013.01); A21D 2/186
(2013.01); A21D 13/066 (2013.01)
(58) Field of Classification Search
CPC ....... A21D 2/263; A21D 2/186; A21D 13/066
See application file for complete search history.

(56) References Cited

U.S. PATENT DOCUMENTS

| | | | |
|---|---|---|---|
| 7,595,081 | B1 | 9/2009 | Bellar |
| 2011/0027421 | A1 | 2/2011 | Stratakis |
| 2024/0090515 | A1 | 3/2024 | Da Silva Boucher et al. |

FOREIGN PATENT DOCUMENTS

| | | |
|---|---|---|
| CN | 101385543 | 3/2009 |
| CN | 104146020 | 4/2016 |
| CN | 110050811 | 7/2019 |
| EP | 2392215 A1 | 12/2011 |
| EP | 2 278 886 | 10/2012 |
| EP | 2885979 A1 | 6/2015 |
| JP | 42-1463 | 1/1967 |

(Continued)

OTHER PUBLICATIONS

Machine translation of JP 10-191877 to Nakano, published Jul. 28,
1998, pp. 1-15. (Year: 1998).*

(Continued)

*Primary Examiner* — Jenna A Watts
(74) *Attorney, Agent, or Firm* — Wenderoth, Lind &
Ponack, L.L.P.

(57)        ABSTRACT

This invention provides an expanded food containing a milk
protein in a proportion of 75 mass % or more based on the
total protein, wherein the expanded food has a pore structure
as measured with an X-ray computed tomography scanner,
the structure satisfying the following ranges:
Specific Surface Areas:
  (1A) Specific surface area of solid region: 6 to 22/mm;
  and
  (1B) Specific surface area of void: 3 to 8/mm.

20 Claims, 19 Drawing Sheets

(56) References Cited

FOREIGN PATENT DOCUMENTS

| | | | | |
|----|----|----|----|----|
| JP | 2-215334 | 8/1990 | | |
| JP | 8-182472 | 7/1996 | | |
| JP | 10-191877 | 7/1998 | | |
| JP | 11-266775 | 10/1999 | | |
| JP | 2003-259796 | 9/2003 | | |
| JP | 2004-321097 | 11/2004 | | |
| JP | 2004-357631 | 12/2004 | | |
| JP | 2007-110953 | 5/2007 | | |
| JP | 2008-17802 | 1/2008 | | |
| JP | 2008-81882 | 4/2008 | | |
| JP | 2008-278786 | 11/2008 | | |
| JP | 2009-142181 | 7/2009 | | |
| JP | 2011-97897 | 5/2011 | | |
| JP | 2012090589 A * | 5/2012 | ............ | A21D 13/08 |
| JP | 2014-23454 | 2/2014 | | |
| JP | 2018-64508 | 4/2018 | | |
| JP | 2018-174860 | 11/2018 | | |
| JP | 2020-141603 | 9/2020 | | |
| JP | 2020-191848 | 12/2020 | | |
| KR | 10-2019-0081115 | 7/2019 | | |
| PL | 213549 | 3/2013 | | |
| WO | 2018/180667 | 10/2018 | | |
| WO | 2021/042162 | 3/2021 | | |
| WO | 2021/074117 | 4/2021 | | |

OTHER PUBLICATIONS

Machine translation of JP2012-90589 to Kaneya et al., published May 17, 2012, pp. 1-8. (Year: 2012).*

Office Action issued Oct. 1, 2025 in U.S. Appl. No. 18/564,313.

Microwave eggless protein steamed bread, Cookpad, http://cookpad.com/recipe/6628312, 2021, with English translation.

Beans/ Soybeans/ [others]/ Okara/ Dried, Food Composition Database, https://fooddb.mext.go.jp/result/result_top.pl?USER_ID=17.000, 2022.

Milk/<Milk and Milk products>/(Liquid milk)/ (General milk), Food Composition Database, https://fooddb.mext.go.jp/result/result_top.pl?USER_ID=17.7063, 2020.

Lemon-Flavored, steamed bread containing protein, Cookpad, http://cookpad.com/recipe/5642414, 2019, with English translation.

Super easy! Low carbohydrate! Protein pancake, Cookpad, http://cookpad.com/recipe/4022829, 2022.

Pain, 2004, vol. 51, pp. 8-12.

Scanlon et al., "Bread properties and crumb structure", Food research International, 2001, vol. 34, pp. 841-864.

International Search Report issued Aug. 16, 2022 in International (PCT) Application No. PCT/JP2022/022019.

International Search Report issued Aug. 16, 2022 in International (PCT) Application No. PCT/JP2022/022015.

Cereals/Common oats/oatmeal, Food Composition Database, https://fooddb.mext.go.jp/details/details/pl?ITEM_NO=1_01004_7, 2020.

Nuts and Seeds Coconut powder, Food Composition Database, https://fooddb.mext.go.jp/details/details.pl?ITEM_NO=1_05016_7, 2020.

Milk and Milk Products/Yogurt/whole milk, unsweetened, Food Composition Database, https://fooddb.mext.go.jp/details/details/pl?ITEM_NO=1_13025_7 2020.

Okara Powder-Calorie Counting/Nutritional Content/Calorie Slism, https://calorie.slism.jp/104089, 2020.

Food Composition Database, Milk and Milk Products/Liquid milk/whole milk, https://fooddb.mext.go.jp/details/details.pl?ITEM_NO=1_13003_7.

Super easy! Low carb! Protein pancake, Tanaka family's dining table, https://cookpad.com/recipe/4022829, 2016.

Shibata et al., "Development of Quantitative Analysis for Relationships between Viscoelasticity and Air-Bubble Structure of Bread", Journal of the Japanese Society for Food Science and Technology, 2010, vol. 57, No. 7, pp. 296-303, Abstract.

International Search Report issued Aug. 16, 2022 in International (PCT) Application No. PCT/JP2022/022014.

Small Foccaccia Bread, Mintel GNPD[online],http://www.gnpd.com, ID#1518270, Apr. 2011.

Kamo, Rakuten, Recipe and cooking method, Steamed protein pancake, https://recipe./rakuten.co.jp/receipe/1430016927, Apr. 2020.

Seguchi, New Food Industry, Gluten-free grain foods and beverages, New explanation about gluten-free bread-1, 2019, vol. 61, No. 3, pp. 231-241.

Extended European Search Report issued Apr. 8, 2025 in European Patent Application No. 22816072.7.

Extended European Search Report issued Apr. 8, 2025 in European Patent Application No. 22816070.1.

Non-Final Office Action issued Feb. 3, 2026 in U.S. Appl. No. 18/564,328, pp. 1-10.

Final Office Action issued Mar. 9, 2026 in U.S. Appl. No. 18/564,313, pp. 1-13.

Restriction Requirement issued Nov. 19, 2025 in U.S. Appl. No. 18/564,328.

* cited by examiner (1)

Direction Perpendicular to Expansion (Vertical Side)

Direction in Which Food is

Actually Bitten (Eating Side)

(2)

Vertical Side

Vertical Side

Eating Side

Eating Side (A)

(B)

(A)

(B)

(A)

(B)

(A)

(B)

(A)

(B)

(A)

(B)

(A)

(B)

(A)

(B)

(A)

(B)

(A)

(B)

(A)

(B)

(A)

(B)

(A)

(B)

(A)

(B)

(A)

(B)

(A)

(B)

(A)

(B)

(A)

(B)

PUFFED FOOD

TECHNICAL FIELD

The present disclosure relates to an expanded food having a novel pore structure (sudachi [pore structure]). The present disclosure preferably relates to an expanded food that does not substantially contain a wheat-derived protein and that has a novel pore structure.

BACKGROUND ART

The pore structure of bread, which is a type of expanded food, is called "sudachi" and is considered an important factor in determining the texture of bread. At the production site, sudachi is considered an important quality, and it is believed that trained experts can predict the texture of bread from the conditions of sudachi by visual observation (Non-patent Literature (NPL) 1 and 2). Accordingly, there have been attempts to quantify the relationship between bread texture and sudachi (see NPL 3).

In recent years, the demand for gluten-free food is increasing. In the past, gluten-free food was construed as food for some people who were unable to consume gluten due to, for example, celiac disease or intolerance to gluten; however, with the recent rise in diet and health consciousness, the demand for gluten-free food is increasing even from general consumers.

Multiple patent applications have been filed for gluten-free food as listed below.

For example, Patent Literature (PTL) 1 discloses a method for producing a bread-like food product that has a fluffy texture and that does not contain a wheat protein. This method comprises baking a dough containing an egg, unripened cheese or fermented milk, a leavening agent, a plant protein (excluding a wheat protein) or milk protein, and xanthan gum and/or guar gum. This bread-like food product obtained by using an egg, cheese, and a leavening agent, such as baking powder, as the main ingredients, without using a wheat protein, is known as "cloudy bread" for its fluffy texture.

PTL 2 discloses a method for producing a bakery product mainly containing a soy protein in place of a wheat-derived protein. In this method, a bakery dough containing 5 to 30 wt % of a powdered soybean protein, 10 to 30 wt % of oil, 2 to 20 wt % of eggs, and 45 to 58 wt % of water, and containing starches in an amount of less than 50 wt % based on the powdered soybean protein, is molded and then heated to be expanded. This bakery product has a soft skin and a soft texture, nicely melts in the mouth, and has a texture similar to that of bread or donuts even without using any wheat flour.

PTL 3 discloses a method for producing baked confectionery that is free of gluten. In this method, a dough or batter containing about 10 to 75 wt % of whole egg, about 5 to 15 wt % of a water-dispersible soy protein isolate, about 0.1 to 2.0 wt % of hydrocolloid, and water, on a wet basis, and not containing wheat flour is baked to form a support matrix. Because of its low carbohydrate content, this baked confectionery is regarded as useful for dietary weight-loss programs, such as low-carb diets.

Additionally, although it is not gluten-free food, many proposals have been made for bakery products containing fermented milk or a milk-fermented product, such as yogurt, as well as for methods for producing breads by using lactic acid bacteria, as in PTL 1 mentioned above.

For example, PTL 4 discloses producing bread by adding fermented milk without sterilization to bread dough containing wheat flour as the main ingredient, thereby achieving effects, such as increasing the tensile strength of the bread dough (the dough becomes tighter), shortening the fermentation time, obtaining fine-textured, high-quality bread, and delaying the aging process of the bread.

PTL 5 discloses producing breads by adding fermented milk in an amount of 1 to 30 parts by weight per 100 parts by weight of wheat flour and allowing lactic acid bacteria to present in the dough in a viable state to achieve aging. PTL 5 discloses that this method produces bread having a good taste with a rich milk flavor and butter flavor.

PTL 6 discloses producing bread by baking bread dough containing hops yeast and grain flour, such as wheat flour, and additionally lactic acid bacteria. PTL 6 discloses that the presence of lactic acid bacteria can impart a unique refreshing aroma to the bread.

PTL 7 discloses producing confectionery with fermented flavor by conducting, one or more times, an operation of fermenting wheat flour and/or rye flour with yeast fungi and lactic acid bacteria to obtain a primary fermentation substrate, adding thereto grain flour other than the above to perform fermentation, and then adding grain flour other than wheat flour and rye flour to the resulting fermentation product to perform fermentation to thus prepare a fermented grain flour product; blending eggs and seasonings, such as fats and oils, with the prepared fermented grain flour product; molding the resulting product; and baking it. By doing so, according to PTL 7, confectionery that has a high nutritional value, sufficient fermentation flavor, umami, good water retention, and good texture, such as flexibility and extensibility, is obtained.

PTL 8 discloses producing breads by adding water containing lactic acid bacteria to partially peeled wheat grains having a specific peeling rate and particle size, subjecting the mixture to soaking treatment to prepare a soaked product, and using the prepared soaked product. By doing this, according to PTL 8, breads that have a rich aroma with excellent sweetness, as well as a good balance between the hardness of wheat grains and the softness of the surrounding area are obtained due to the influence of the partially peeled wheat grains contained in the bread.

PTL 9 discloses producing bread by adding lactic acid bacteria sponge obtained by fermentation with lactic acid bacteria to bread dough raw materials that include wheat flour, carbohydrates, and water as raw materials. By doing so, according to PTL 9, the dough is cooked well during baking, the bread skin is made thinner, the texture becomes finer, and bread with excellent elasticity and water retention can be produced.

PTL 10 discloses producing bread by adding a flavor liquid obtained by fermenting molasses with lactic acid-producing bacteria in the process of producing bread containing wheat flour as the main raw material, thus imparting a unique and unconventional flavor and aroma.

PTL 11 discloses a method for producing sour bread by using wheat flour or rice flour as the raw material flour. Specifically, PTL 11 discloses that the use of a production method in which a secondary raw material flour is added to a lactic acid dough obtained by fermenting a primary raw material flour with lactic acid bacteria, and the resulting dough is kneaded sufficiently, followed by baking, can produce sour bread in a short time and in a large amount.

PTL 12 also discloses a production method for sour bread. PTL 12 discloses that the GABA production amount is significantly increased by using a combination of mesophilic

*Lactococcus* and thermophilic lactic acid bacteria in the production of starting sourdough containing grain flour, such as wheat flour or rye flour, as the raw material.

PTL 13 and PTL 14 disclose a method for producing a pizza crust by using a lactic acid bacteria-containing dairy food product, such as yogurt. PTL 13 discloses producing a pizza crust by adding bound water comprising milk, yogurt, and cheese to wheat flour, which is the main raw material of pizza dough, followed by kneading and molding. By doing this, according to PTL 13, textures and flavors comparable to those obtained when the crust was baked immediately after kneading are achieved even if it is frozen or refrigerated. PTL 14 discloses producing a pizza crust (breads) by adding a lactic acid bacteria-containing dairy product and bread yeast to grain flour and then adding dough starter to the pizza dough. This pizza crust, according to PTL 14, has a good baking color by baking and has savory and rich flavors, and a moist and glutinous texture.

PTL 15 discloses a composite biscuit product containing a filling comprising a yogurt powder containing live lactic cultures and 10 to 30 wt % of dry starch having a water content of less than 8 wt %, wherein the filling has a water activity of 0.05 to 0.25 (as measured with an AquaLab CX-2 or series 3), and one or more biscuit parts containing grain flour. This composite biscuit product, according to PTL 15, has an improved shelf life and stability by containing live lactic cultures in the presence of dried starch.

PTL 16 discloses a low-calorie biscuit product containing 0.2 to 0.6 wt % of yogurt powder as a flavoring agent. However, this yogurt powder is a flavoring agent, and this biscuit product is a gluten-containing product comprising 40 to 42 wt % of wheat flour, 1 to 2.5 wt % of gluten, and 18 to 23 wt % of starch.

As explained above, these techniques attempt to improve the flavor, texture, shelf life, etc. of bread etc. by adding a milk-fermented product or lactic acid bacteria to the dough of bread, pizza, etc. containing grain flour, such as wheat flour, as the main raw material. In other words, these techniques are intended for food products that contain, as a protein, gluten, which is a wheat protein.

CITATION LIST

Patent Literature

PTL 1: JP2018-174860A
PTL 2: JP2008-81882A
PTL 3: U.S. patent Ser. No. 07/595,081
PTL 4: JPS42-1463B
PTL 5: JPH02-215334A
PTL 6: JP2004-321097A
PTL 7: JP2004-357631A
PTL 8: JP2008-17802A
PTL 9: JP2009-142181A
PTL 10: JP2011-97897A
PTL 11: JPH11-266775A
PTL 12: JP2007-110953A
PTL 13: JP2003-259796A
PTL 14: JP2014-23454A
PTL 15: EP Patent No. 2885979
PTL 16: EP Patent No. 2392215

Non-Patent Literature

NPL 1: Japan Institute of Baking, Evaluation criteria for bread (1), Bread Technology, 598 (2004)

NPL 2: Scanlon, M. G. and Zghal, M. C., Bread properties and crumb structure. Food Res. Int., 34, 841-864 (2001)
NPL 3: Shibata, Mario et al., "Development of Quantitative Analysis for Relationships between Viscoelasticity and Air-bubble Structure of Bread," Journal of the Japanese Society for Food Science and Technology, Volume 57, No. 7, July 2010

SUMMARY OF INVENTION

Technical Problem

A problem to be solved by the present disclosure is to provide an expanded food having a novel pore structure (sudachi). Preferably, a problem to be solved by the present disclosure is to provide an expanded food that does not substantially contain a wheat-derived protein and that has a novel pore structure.

Solution to Problem

In order to solve the above problems, the present inventors conducted extensive research and found that heat treatment of a dough composition comprising a milk protein in a proportion of 75 mass % or more based on the total protein, without substantially comprising a wheat-derived protein, such as gluten, can cause the dough composition to expand like bread and form a support matrix. The inventors further confirmed that the pore structure composed of the support matrix differs from the pore structure of conventional bread, which is produced by using wheat flour as a raw material.

The present disclosure has been completed through further research based on such findings. The present disclosure includes the following embodiments.

(I) Expanded Food

Item 1. An expanded food containing a milk protein in a proportion of 75 mass % or more based on the total protein, wherein the expanded food has a pore structure as measured with an X-ray computed tomography scanner, the structure having specific surface areas within the following ranges:

Specific Surface Areas:

(1A) Specific surface area of solid region: 6 to 22/mm; and (1B) Specific surface area of void: 3 to 8/mm.

Item 2. The expanded food according to Item 1, wherein the pore structure as measured with an X-ray computed tomography scanner is identified according to the following solid region thickness distribution:

Solid Region Thickness Distribution:

(2A) Mean value of solid region thickness: 180 to 450 μm; and (2B) Standard deviation of solid region thickness: 80 to 230 μm.

Item 3. The expanded food according to Item 1 or 2, wherein the milk protein contains a protein derived from a milk-fermented product.

Item 4. The expanded food according to any one of Items 1 to 3, wherein the expanded food contains one or more edible compositions that comprise the milk protein, and at least one of the edible compositions is a milk-fermented product.

Item 5. The expanded food according to any one of Items 1 to 4, which does not substantially contain a wheat-derived protein.

Item 6. The expanded food according to any one of Items 1 to 5, which is obtained by subjecting a dough composition comprising (a) a milk protein in a proportion of 75 mass % or more based on the total protein, (b) a starch, (c) a leavening agent, and (d) water to heat treatment to cause the dough composition to expand and form a support matrix.

Item 7. The expanded food according to Item 6, wherein (b) the starch is at least one member selected from the group consisting of natural starches and processed starches.

Item 8. The expanded food according to Items 6 or 7, wherein (c) the leavening agent is at least one member selected from the group consisting of yeast, baking powder, baking soda, and ispata.

Item 9. The expanded food according to any one of Items 6 to 8, which further contains (e) a thickener.

Item 10. The expanded food according to any one of Items 1 to 9, which does not substantially contain a processed rice product, Item 11. The expanded food according to any one of Items 1 to 10, which does not contain at least one member selected from the group consisting of eggs and egg-derived ingredients, or does not contain all members in the group.

Advantageous Effects of Invention

Although the expanded food of the present disclosure has a pore structure that is similar to the pore structure (sudachi) of conventional bread, which is produced by using wheat flour as a raw material, the expanded food of the present disclosure is a novel food product having a distinguishable structure based on differences at least in the specific surface areas of solid region and void, and preferably, in addition to these, differences in the structure of solid region thickness (mean value and standard deviation). Based on these structural features, the expanded food of the present disclosure has a novel texture that is different from that of wheat bread. More specifically, although the texture of the expanded food is similar to that of bread in terms of softness in contact with the teeth, the expanded food has a novel texture that is different from that of bread since it adheres or sticks during mastication in the oral cavity to a lesser degree and has a light texture (less clinging sensation (i.e., is less sticky) to the teeth and in the oral cavity when moistened with saliva in the middle mastication stage), and since the moistened bolus in the late mastication stage in the oral cavity easily breaks down (i.e., quickly and easily breaks down in the oral cavity). Accordingly, the expanded food according to the present disclosure has a characteristic novel texture and is easily masticated and swallowed.

Additionally, the expanded food according to the present disclosure can be produced without substantially containing a wheat-derived protein, such as gluten, and can provide bread-like food that is free of gluten. Furthermore, these gluten-free, bread-like food products can shorten the production time since the process of kneading the dough and the process of allowing the dough to rest can be omitted or shortened.

BRIEF DESCRIPTION OF DRAWINGS

FIG. 1 (2): An illustration of the test specimen used for the photography of Experimental Example 1.

6

Figure 3:
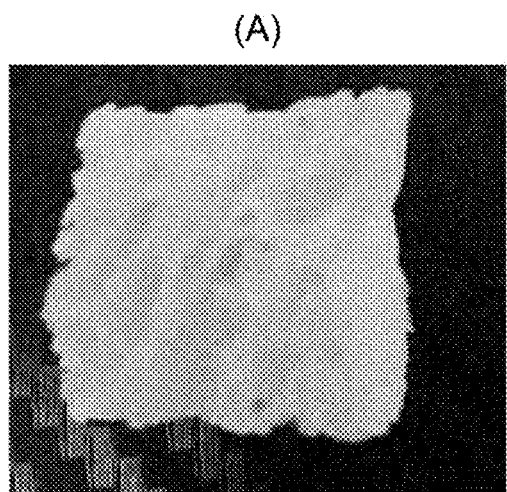
Figure 3:
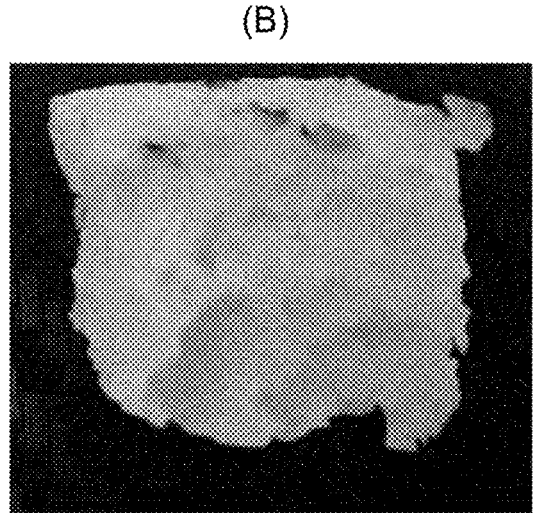

FIG. 3: Images of (A) the eating side and (B) the vertical side of the internal cross-section of the bread-like food in Example 2.

Figure 4:
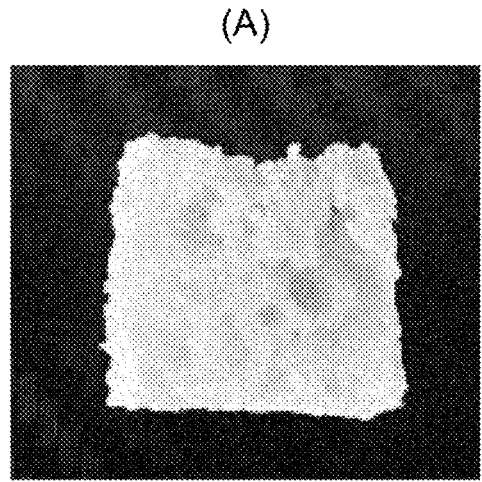
Figure 4:
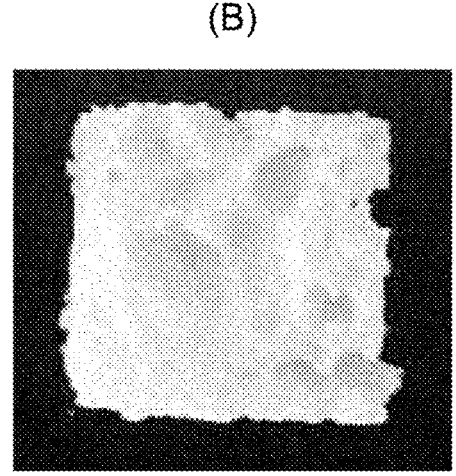

FIG. 4: Images of (A) the eating side and (B) the vertical side of the internal cross-section of the bread-like food in Example 3.

Figure 5:
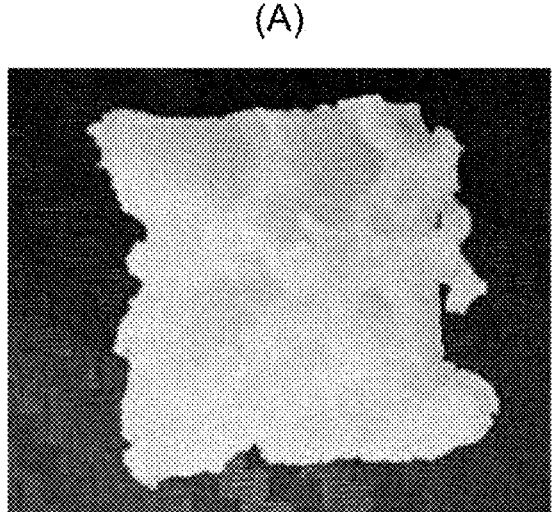
Figure 5:
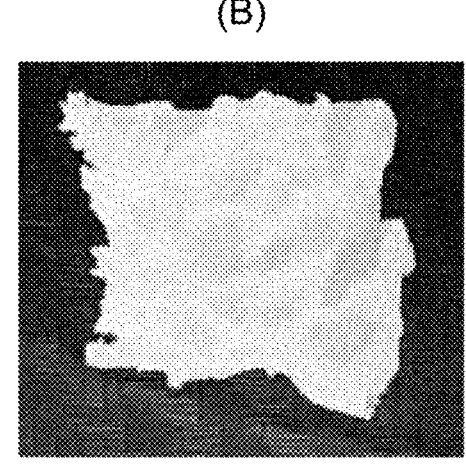

FIG. 5: Images of (A) the eating side and (B) the vertical side of the internal cross-section of the bread-like food in Example 4.

Figure 6:
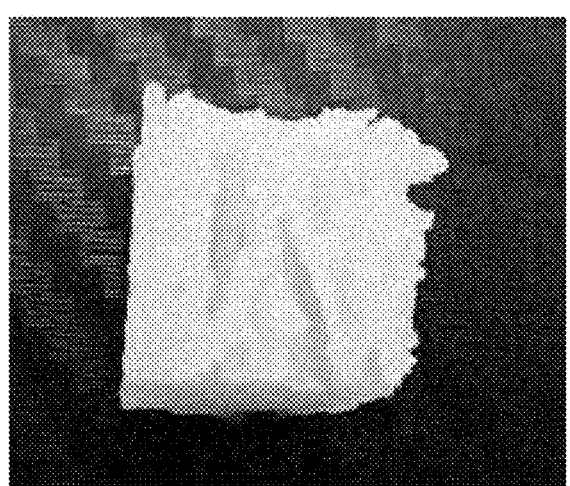
Figure 6:
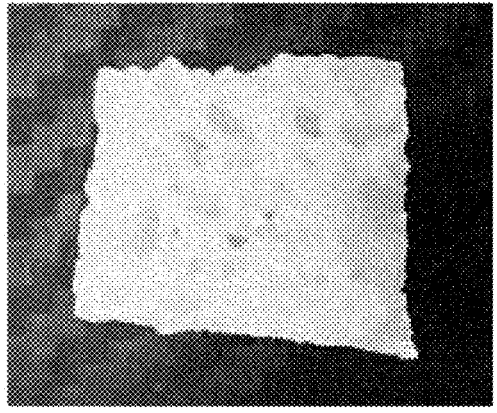

FIG. 6: Images of (A) the eating side and (B) the vertical side of the internal cross-section of the bread-like food in Example 5.

Figure 7:
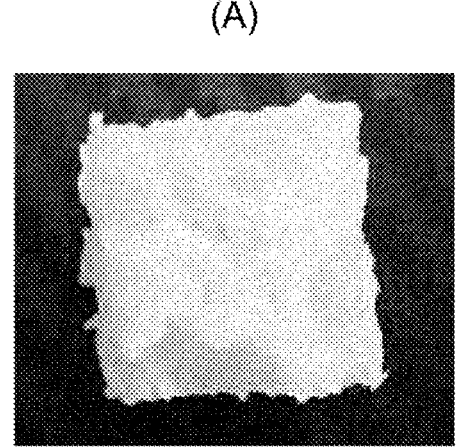
Figure 7:
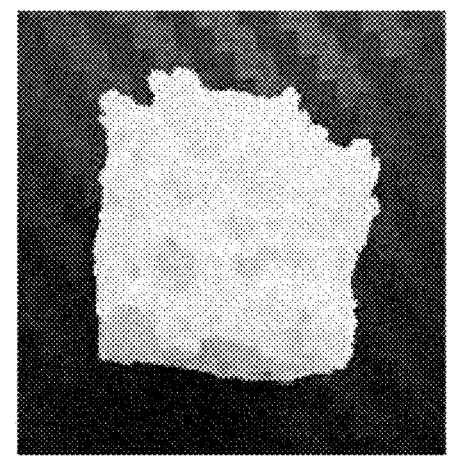

FIG. 7: Images of (A) the eating side and (B) the vertical side of the internal cross-section of the bread-like food in Example 6.

Figure 8:
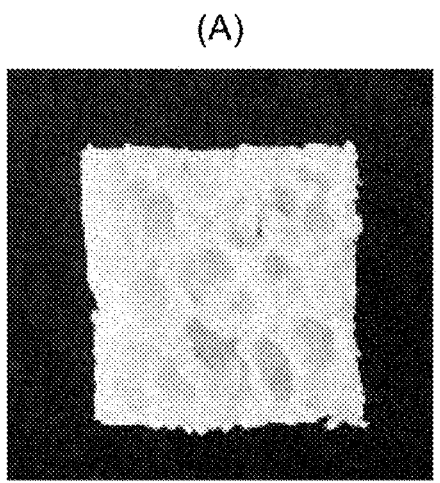
Figure 8:
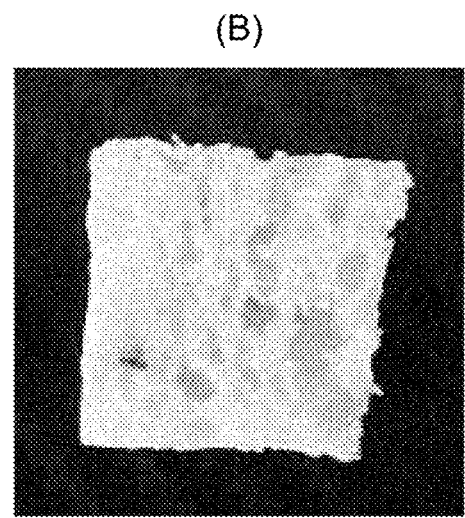

FIG. 8: Images of (A) the eating side and (B) the vertical side of the internal cross-section of the bread-like food in Example 7.

Figure 9:
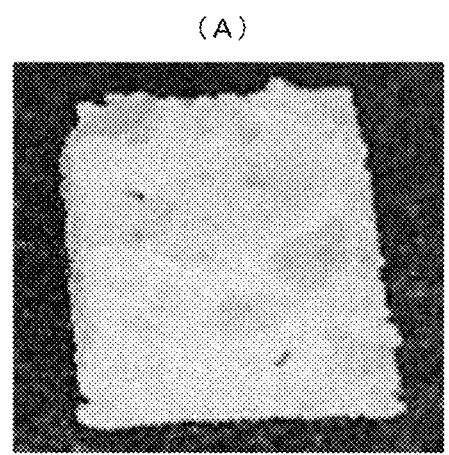
Figure 9:
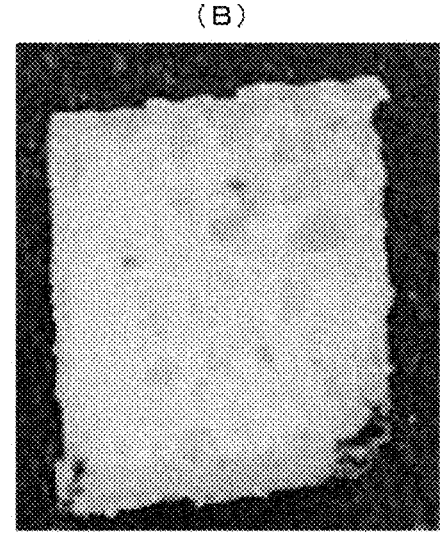

FIG. 9: Images of (A) the eating side and (B) the vertical side of the internal cross-section of the bread-like food in Example 8.

Figure 10:
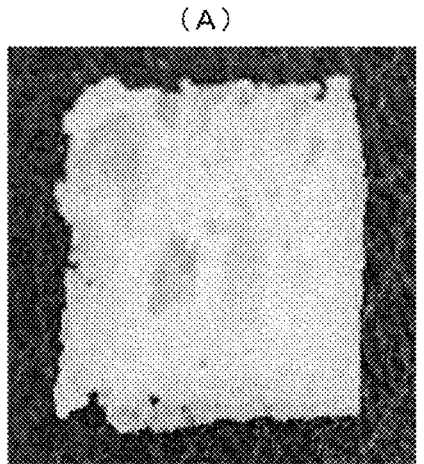

FIG. 10: Images of (A) the eating side and (B) the vertical side of the internal cross-section of the bread-like food in Example 9.

Figure 11:
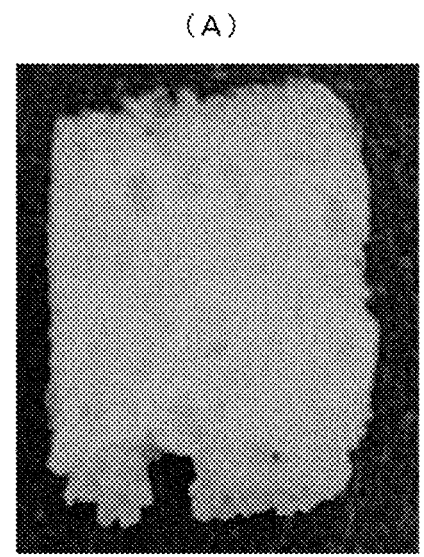
Figure 11:
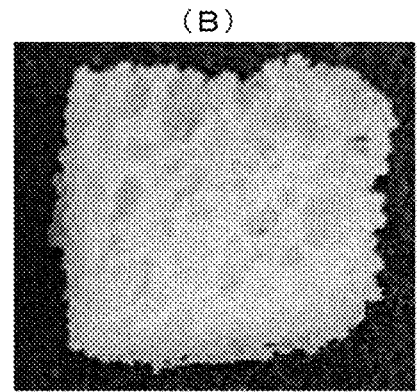

FIG. 11: Images of (A) the eating side and (B) the vertical side of the internal cross-section of the bread-like food in Example 10.

Figure 12:
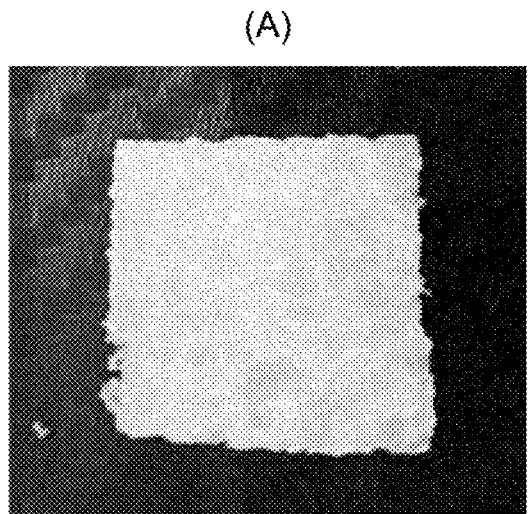
Figure 12:
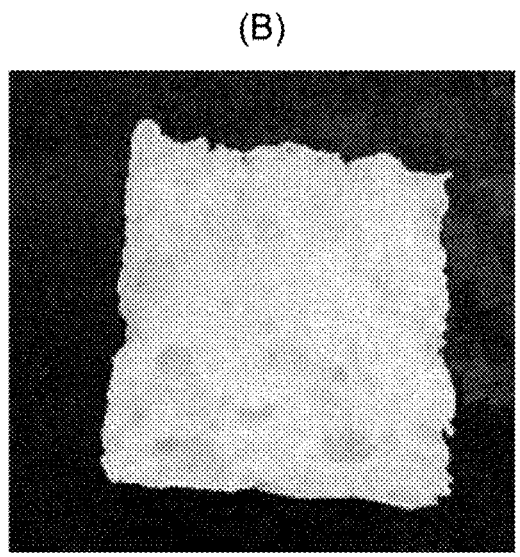

FIG. 12: Images of (A) the eating side and (B) the vertical side of the internal cross-section of the bread of Comparative Example 1.

Figure 13:
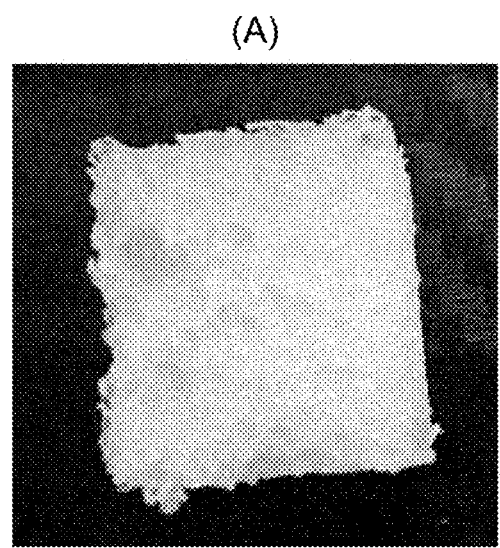
Figure 13:
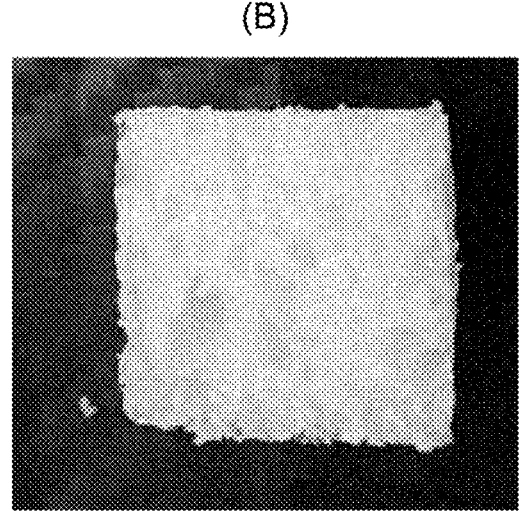

FIG. 13: Images of (A) the eating side and (B) the vertical side of the internal cross-section of the bread in Comparative Example 2.

Figure 14:
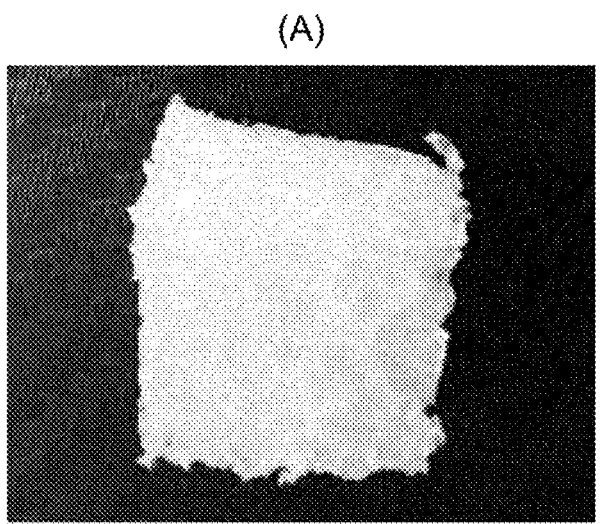
Figure 14:
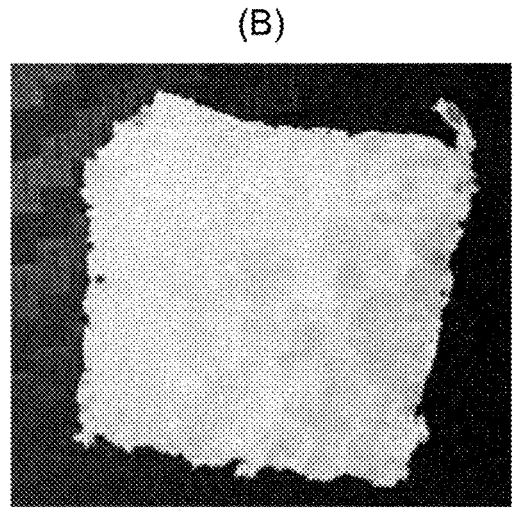

FIG. 14: Images of (A) the eating side and (B) the vertical side of the internal cross-section of the bread in Comparative Example 3.

Figure 15:
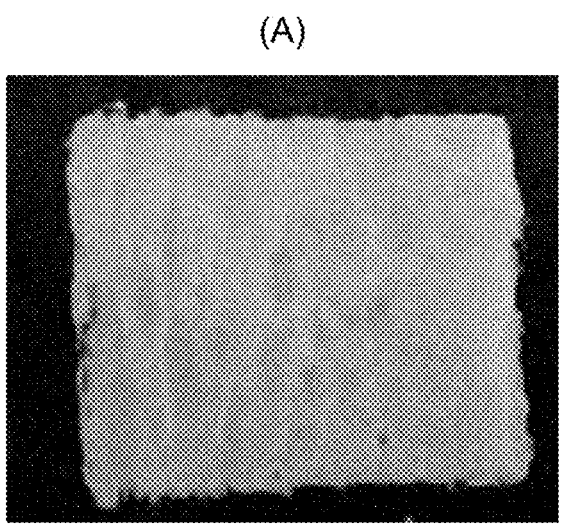
Figure 15:
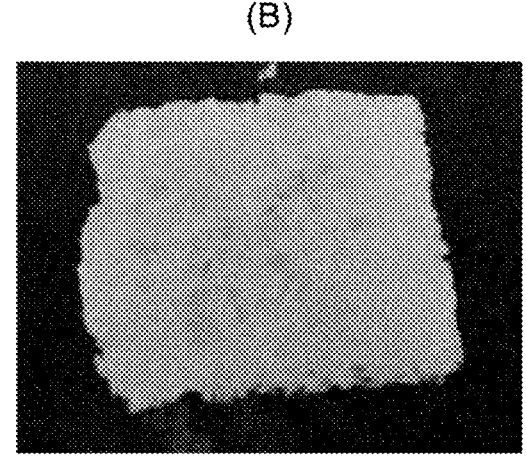

FIG. 15: Images of (A) the eating side and (B) the vertical side of the internal cross-section of the bread in Comparative Example 4.

Figure 16:
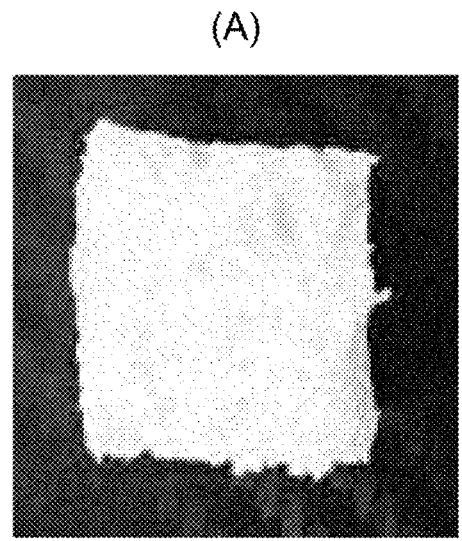
Figure 16:
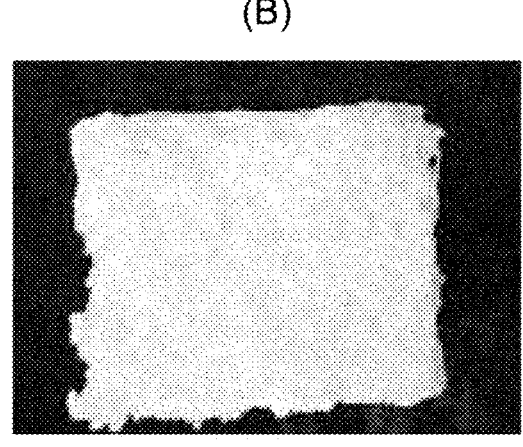

FIG. 16: Images of (A) the eating side and (B) the vertical side of the internal cross-section of the bread in Comparative Example 5.

Figure 17:
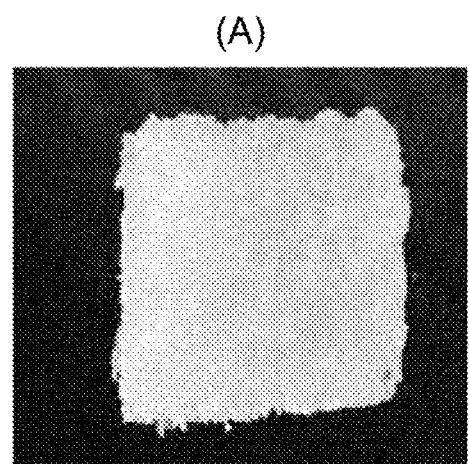
Figure 17:
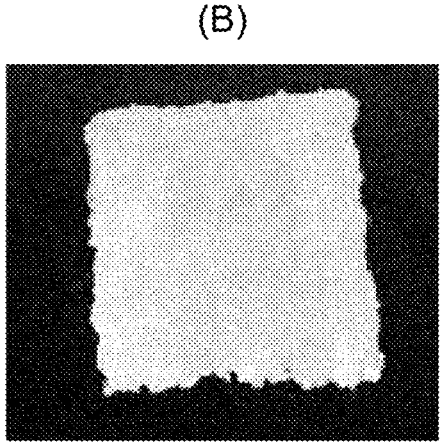

FIG. 17: Images of (A) the eating side and (B) the vertical side of the internal cross-section of the bread in Comparative Example 6.

Figure 18:
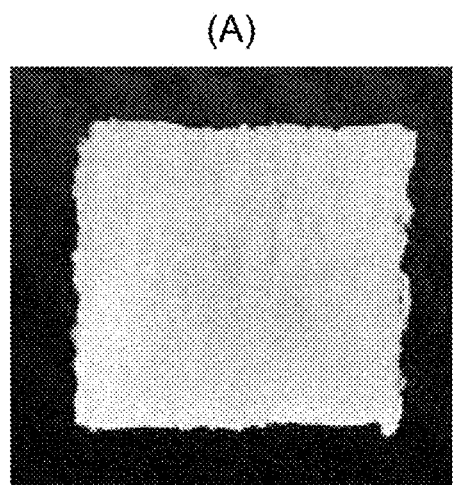
Figure 18:
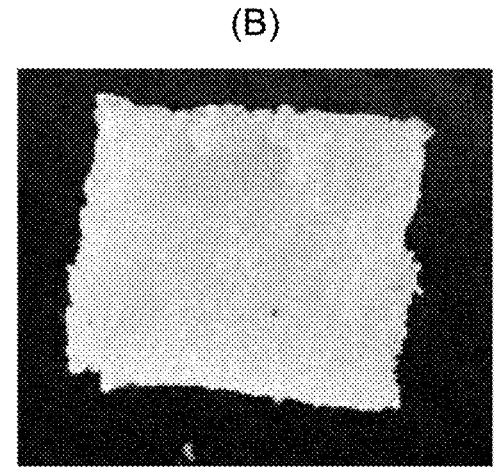

FIG. 18: Images of (A) the eating side and (B) the vertical side of the internal cross-section of the bread in Comparative Example 7.

Figure 19:
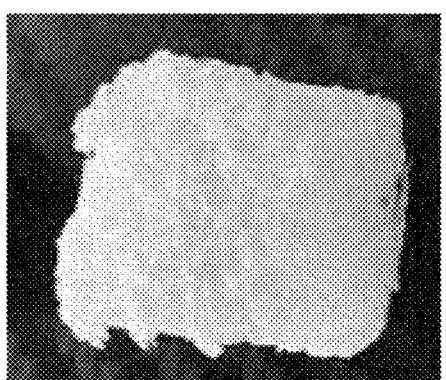
Figure 19:
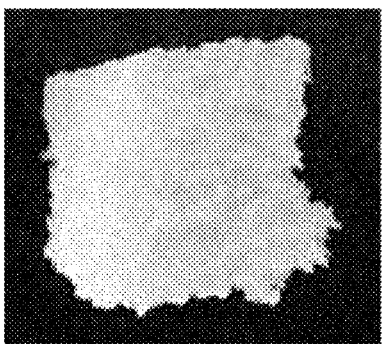

FIG. 19: Images of (A) the eating side and (B) the vertical side of the internal cross-section of the bread in Comparative Example 8.

DESCRIPTION OF EMBODIMENTS (I) Expanded Food

"Expanded food" typically refers to processed food produced by subjecting a protein, a carbohydrate, a leavening agent, and water as main ingredients to heat treatment, such as baking, deep-frying, steaming, or baking in a covered pan. The processed food is expanded by heat treatment, and the support composed of heat-treated protein, carbohydrate (mainly starch), etc. forms a mesh-like solid region (three-dimensional mesh structure) (also referred to as a "support matrix structure").

Examples of such expanded food typically include bread, dried bread products, cakes, waffles, puffs for cream puffs, donuts, fried pastries, pies, pizza, and crepes. Expanded food also includes food products called "bakery products," which are prepared by baking dough containing grain flour in an oven or the like. Examples of grain flours as used here include flours of grains of the Poaceae family (wheat flour, rice flour, barley flour, rye flour, oats flour, adlay flour, corn flour, barnyard millet flour, foxtail millet flour, proso millet flour, and teff flour), flours of pulses (roasted soybean flour, soybean flour, chickpea flour, pea flour, and mung bean flour), pseudocereal flours (buckwheat flour and amaranth flour), potato and root flours (potato starch, tapioca flour, kudzu starch, and potato flour), and nut flours (chestnut flour, acorn flour, and coconut flour). Examples of bread include meal bread (e.g., shokupan [Japanese soft white bread baked in a square pan], rye bread, baguette, hardtack, variety bread, and rolls), filled and stuffed bread (e.g., hot dogs, hamburgers, and pizza pies), sweet bread (e.g., buns with jam filling, buns with sweet bean filling, buns with custard filling, raisin bread, melonpan, sweet rolls, croissants, brioche, Danish pastries, and coronet bread), steamed buns (e.g., steamed meat buns, Chinese buns, and steamed sweet bean buns), and special bread (e.g., grissini, muffins, and naan). Examples of dried bread products include rusks and bread crumbs. Examples of cakes include steamed cake, sponge cake, butter cake, roll cake, pancake, bouchée, baumkuchen, pound cake, cheese cake, and snack cake.

The expanded food, which is the subject of the present disclosure, contains a milk protein in a proportion of 75 mass % or more based on the total protein, and is characterized by having a pore structure as measured with an X-ray computed tomography scanner, the structure having specific surface areas within the following ranges.

Specific Surface Areas:
  (1A) specific surface area of solid region: 6 to 22/mm, preferably 6.00 to 22.00/mm; and
  (1B) specific surface area of void: 3 to 8/mm, preferably 3.00 to 8.00/mm.

Preferably, the expanded food is characterized by having a pore structure as measured with an X-ray computed tomography scanner, the structure having the specific surface areas within the above ranges and also satisfying the following solid region thickness distribution.

Solid Region Thickness Distribution:
  (2A) mean value of solid region thickness: 180 to 450 μm, preferably 180.0 to 450.0 μm; and
  (2B) standard deviation of solid region thickness: 80 to 230 μm, preferably 80.0 to 230.0 μm.

The pore structure of the expanded food can be analyzed according to the method described in Experimental Example 2 below. Specifically, first, a cube is cut out from the internal portion of the target expanded food as in the manner shown in FIG. 1(2) to prepare a cube sample of 1 cm per side. The 1-cm square area of the eating side of this sample can be photographed with an X-ray computed tomography scanner (nano3DX, produced by Rigaku Corporation), and the 5-mm cube area at the center (the gray area in FIG. 1(2)) can be analyzed with image analysis software (Dragonfly, produced by Maxnet Co., Ltd.). The analysis method, conditions, and calculation methods for (1) the specific surface areas (the specific surface area of solid region and the specific surface area of void) and (2) the solid region thickness (the mean value and standard deviation) are described in detail in Experimental Example 2. In the present disclosure, the values of the specific surface area of solid region and the specific surface area of void are average values of the values obtained in the above analysis. Further, the mean value and standard deviation of the solid region thickness are parameters that represent the distribution of solid region thickness in the center (5-mm square area) of the 1-cm square area (1 field) of the sample.

Although not so limited, the specific surface area of solid region can be used to evaluate the complexity of the shape of the solid region (a larger value indicates a more complex shape) and the presence or absence of a stratified structure of the support matrix formed by the solid region. A larger value of the specific surface area of solid region indicates that the structure is such that thin portions lie on top of one another to a greater degree, and a smaller value thereof indicates that the structure is such that thin portions lie on top of one another to a lesser degree. Thus, a larger specific surface area of solid region is evaluated as having a more complex stratified structure as the folded structure of the support matrix in the solid region, while a smaller specific surface area of solid region is evaluated as having a simpler shape of the stratified structure.

Further, the size of the void can be evaluated based on the specific surface area of void. A smaller value of the specific surface area of void indicates larger air bubbles while a larger value indicates smaller air bubbles.

The mean value of solid region thickness can be used to evaluate the strength of the solid region structure. The larger the mean value of solid region thickness, the stronger and more stable the structure, while the smaller the mean value of solid region thickness, the weaker and less stable the structure. Further, the standard deviation can be used to evaluate the non-uniformity of the solid region thickness. A larger standard deviation value indicates that the solid region thickness is non-uniform and that the solid region has various thicknesses, i.e., it indicates the presence of thin and crumbly portions. On the other hand, a smaller standard deviation value indicates that the solid region thickness is uniform and that the structure is relatively stable with no extremely crumbly portions.

For this reason, an expanded food having a small specific surface area of solid region and a small specific surface area of void has a small contact surface for saliva due to its simple stratified structure and its small surface area of solid region, and can be evaluated as having a tendency to absorb less water and to be less sticky when mixed with saliva during mastication (the middle mastication stage). An expanded food having a large mean value of solid region thickness and a large standard deviation thereof has a strong structure; however, due to the presence of crumbly portions, this expanded food can be evaluated as having a tendency to have a texture in which the bolus that is mixed and moistened with saliva easily breaks down when chewed several times.

Examples of preferable embodiments of the structure include the following.

Specific Surface Areas:
  (1A) specific surface area of solid region: preferably 7.5 to 15/mm, more preferably 9 to 12/mm; and
  (1B) specific surface area of void: preferably 4 to 7/mm, more preferably 4.5 to 6.5/mm.

Solid Region Thickness Distribution:
  (2A) mean value of solid region thickness: preferably 250 to 400 μm, more preferably 300 to 350 μm; and
  (2B) standard deviation of solid region thickness: preferably 130 to 200 μm, more preferably 150 to 180 μm.

The expanded food of the present disclosure, which has such a structure in its inside, can be produced by subjecting a dough containing a milk protein in a proportion of 75 mass % or more based on the total protein (a dough composition for expanded food; also referred to below simply as "the dough for expanded food" or "the dough of the present disclosure") to heat treatment. The expanded food encompassed by the present disclosure is not limited. From among the typical expanded food described above, the expanded food of the present invention is preferably a bakery product, and more preferably a food product similar to bread or a dried bread product.

The dough of the present disclosure preferably includes a dough for expanded food that contains a milk protein in a proportion of 75 mass % or more based on the total protein and that does not substantially contain a wheat-derived protein.

A processed wheat product refers to an edible raw material prepared by processing wheat as a raw material. Examples of processed wheat products include wheat flour (soft flour, all-purpose flour, hard flour, and durum semolina) and wheat-derived proteins.

A "wheat-derived protein" refers to a protein derived from wheat and can include gliadin, glutenin, and gluten. Gluten is a protein having a mesh structure formed by kneading gliadin and glutenin contained in wheat in the presence of water.

The phrase "not substantially comprising or containing a wheat-derived protein" means that absolutely no wheat-derived protein is contained, or that even if it is contained, the content of wheat-derived gluten in 100 mass % of the expanded food is less than 1 mass %. The content of wheat-derived gluten is not limited, and is preferably less than 100 ppm (mass percentage, the same applies below), more preferably less than 20 ppm, and even more preferably less than 10 ppm. Even when the wheat-derived protein is partly changed as a result of processing for the processed wheat product, such a wheat-derived protein is regarded as a wheat-derived protein if it is detected as a wheat allergy source.

The dough of the present disclosure for use is not limited and may be a dough that preferably contains (a) a milk protein, (b) a starch, (c) a leavening agent, and (d) water as main ingredients, and that more preferably does not substantially contain a wheat-derived protein. The content of wheat-derived gluten in 100 wet mass % of the dough of the present disclosure can be calculated by conversion based on the proportions above, taking into account the water content in the dough of the present disclosure.

The ingredients are described below. In the present specification, the phrase "100 wet mass % of the dough of the present disclosure" means that the wet mass with the water content of the dough of the present disclosure is defined as 100% (the same applies below).

(a) Milk Protein

In the present disclosure, "milk protein" means a protein derived from milk, in particular, cow's milk. "Milk" is typical mammary secretion obtained from milking animals and intended for consumption or processing directly in liquid form (Codex STAN 206-1999, "General Standard for Use of Dairy Terms"). Examples of milk include raw milk, cow's milk, certified milk, raw goat milk, pasteurized goat milk, raw sheep milk, homogenized milk, low-fat milk, fat-free milk, and processed milk (see Article 2 of the "Ministerial Ordinance on Milk and Milk products Concerning Compositional Standards etc." in the Food Sanitation Act (Ministry of Health, Labor and Welfare, Japan)). Preferred is milk milked from dairy cows.

Examples of proteins derived from milk mainly include casein and whey protein. These casein and whey protein may be derived from a milk-fermented product obtained by fermenting milk with microorganisms, such as lactic acid bacteria and bifidobacteria.

The milk protein for use as a raw material of the dough of the present disclosure may be casein or whey protein isolated or purified from milk, a milk-fermented product, etc., or may be an edible composition comprising casein and/or whey protein. Examples of such an edible composition include milk-fermented products, milk beverages, cow's milk, certified milk, homogenized milk, low-fat milk, fat-free milk, processed milk, cheese, cream, cream powder, butter, buttermilk powder, concentrated whey, protein concentrated whey powder, whey powder, concentrated milk, concentrated skimmed milk, condensed milk (unsweetened, sweetened, skimmed), whole milk powder, skimmed milk powder, sweetened milk powder, formulated milk powder, and other dairy products. These may be used singly or in any combination of two or more. Although not so limited, for example, a milk-fermented product or milk beverage may be combined with cheese, cream, concentrated whey, a protein concentrated whey powder, a skimmed milk powder, etc.

The "milk-fermented product" is a product obtained by fermenting an edible composition comprising a milk protein described above with microorganisms, such as lactic acid bacteria, bifidobacteria, and yeast. Examples include fermented milk and lactic acid bacteria beverage. The fermented milk is obtained by fermenting milk or milk etc. containing nonfat milk solids in an amount equivalent to or greater than that of milk with lactic acid bacteria or yeast, and then forming the resulting product into a paste or liquid, or a frozen product thereof, and has a nonfat milk solids content (components excluding fat and water) of 8.0% or more (see the "Ministerial Ordinance on Milk and Milk products Concerning Compositional Standards etc." in the Food Sanitation Act (Ministry of Health, Labor and Welfare, Japan)). The fermented milk includes yogurt. The lactic acid bacteria beverage is a beverage obtained by processing a product obtained by fermenting milk etc. with lactic acid bacteria or yeast, or a beverage containing a product obtained by fermenting milk etc. with lactic acid bacteria or yeast as the main raw material (excluding fermented milk) (see the Ministerial Ordinance mentioned above). The lactic acid bacteria beverage includes a dairy lactic acid bacteria beverage (which contains 3.0% or more of nonfat milk solids and has a lactic acid bacteria count or yeast count of 10 million/ml or more) and a lactic acid bacteria beverage (which contains less than 3.0% of nonfat milk solids and has a lactic acid bacteria count or yeast count of 1 million/ml or more). For fermented milk that has been sterilized based on a thermal history equivalent to 75° C. for 15 minutes or more, the bacteria count above is optional.

The "milk beverage" refers to a processed beverage obtained by mixing a product containing milk or a dairy product as the main raw material with an ingredient other than milk (fruit juice, vitamins, sugars, coffee, minerals, etc.), and has a milk solids content of 3.0% or more (see the "Fair Competition Code Regarding the Labeling of Milk Beverage" (Japan)).

A protein derived from a milk-fermented product or from a milk beverage (the protein derived from a milk-fermented product may also be referred to below as a "milk-fermented product-derived protein") is preferably used partly or entirely as the milk protein. More preferred is a method of using a milk-fermented product, such as yogurt, or a milk beverage, singly or in combination with cheese, cream, butter, etc. mentioned above, as the edible composition comprising a milk protein.

The proportion of the milk protein in the dough of the present disclosure is 75 mass % or more based on the total protein content in the dough of the present disclosure. The proportion is preferably 77 mass % or more, more preferably 80 mass % or more, even more preferably 85 mass % or more, and particularly preferably 90 mass % or more. In a preferable embodiment, the proportion is preferably 93 mass % or more, more preferably 95 mass % or more, even more preferably 98 mass % or more, and particularly preferably 99 mass % or more, and the proportion may be less than 100 mass %. When the milk-fermented product-derived protein is contained in the milk protein, the proportion of the milk-fermented product-derived protein may be 9 mass % or more, preferably 10 mass % or more, more preferably 11 mass % or more, and even more preferably 12 mass % or more based on the total protein in the dough of the present disclosure.

The proportion of the total protein contained in 100 wet mass % of the dough of the present disclosure is 10 to 30 mass %, preferably 12.5 to 27.5 mass %, and more preferably 15 to 25 mass %.

The total protein content in the dough of the present disclosure can be measured by a protein measurement method (combustion method). This combustion method is an official method described in the appendix "Analysis Method etc. of Nutritional Ingredients etc." of the "Food Labeling Standards" (Mar. 30, 2015, Consumption Table No. 139) stipulated by the Food Labeling Standards based on Article 4 (1) of the Food Labeling Act (Act No. 70 of 2013) established by the Japan Consumer Affairs Agency. Below, the "official method" means the analysis method described in the "Analysis Method etc. of Nutritional Ingredients etc." The total protein content in the dough of the present disclosure can be calculated based on the predetermined protein content in the protein-containing edible composition to be blended (see, for example, the Standard Tables of Food Composition in Japan).

(b) Starch

The origin of the starch used as a raw material for the dough of the present disclosure is not particularly limited as long as the starch does not contain wheat-derived protein. Examples include starch derived from grain, non-grain plant seeds, vegetables containing starchy materials, or tree nuts. The "grain" includes rice (uruchimai (non-glutinous rice) and mochigome (glutinous rice)), wheat, barley, rye, oats, corn, waxy corn, awa (foxtail millet), hie (barnyard millet), kibi (proso millet), and adlay millet. Preferably, the grain is those other than gluten-containing grain such as wheat, barley, rye, and oats (gluten-free grain). The grain can also be those other than gluten-containing grain and rice. Examples of plant seeds include pulses, such as mung beans, soybeans, peas, and chickpeas, and pseudocereals such as buckwheat and amaranth. Examples of vegetables containing starchy materials include potatoes, such as potato, sweet potato, taro, cassava, and konnyaku potato, and root vegetables, such as bracken, kudzu (*Pueraria montana* var. *lobata*), and katakuri (*Erythronium japonicum*). Examples of tree nuts include chestnuts, acorns, and coconuts. The starch is preferably one derived from corn, waxy corn, potato, or tapioca, and more preferably one derived from waxy corn.

The starch for use as a raw material for the dough of the present disclosure may be natural starch isolated or refined from the plants described above or an edible composition containing natural starch (starch raw material). The starch raw material includes grain other than wheat (preferably grain other than gluten-containing grain (gluten-free grain), more preferably grain other than gluten-containing grain and rice), endosperms of such grain, or flour prepared by grinding such endosperms together with the attached germ and husk (grain flour other than wheat flour, preferably grain flour other than gluten-containing grain flour (gluten-free grain), more preferably grain flour other than gluten-containing grain flour and rice); plant seeds other than grain containing starchy materials (pulses and pseudocereals), endosperms of such plant seeds, or flour prepared by grinding such endosperms together with the attached germ and husk (seed flour); powder of vegetables containing starchy materials (potatoes or root vegetables) (vegetable flour); and powdered tree nuts. Wheat-derived starch may be added as long as the starch is a gluten-free material. However, it may not be added.

The starch used as a raw material for the dough of the present disclosure also includes processed starches (functional starches made by physically and/or chemically treating natural starch) as well as the natural starches described above. Examples of processed starches include the following starches prepared by processing natural starches (raw material) such as potato starch, corn starch, waxy corn starch, or tapioca starch: acetylated adipic acid crosslinked starch, acetylated phosphorylated crosslinked starch, acetylated oxidized starch, sodium starch octenylsuccinate, acetic starch, oxidized starch, hydroxypropyl starch, hydroxypropyl distarch phosphate, phosphated distarch phosphate, monostarch phosphate, distarch phosphate, unmodified alpha starch, and modified alpha starch.

These starches may be used singly or in a combination of two or more. The starch is preferably, but is not limited to, corn starch, waxy corn starch, processed starch thereof, or a combination thereof.

The starch is present in a proportion of 2 to 25 mass %, preferably 5 to 20 mass %, and more preferably 10 to 15 mass % in 100 wet mass % of the dough of the present disclosure. The starch content in the dough of the present disclosure can also be calculated from the formula indicated in the label of the starch-containing edible composition to be added. The starch content in the dough of the present disclosure can also be calculated from the proportion of the remainder determined by subtracting the measured values of protein (combustion method), lipids (acid digestion), ash (ashing with magnesium acetate), dietary fiber (Prosky method), sugar (gas chromatography), and water (ambient pressure heat-drying) determined according to official methods from the measured value (wet mass) of the dough of the present disclosure.

Although not limited, the carbohydrate is present in a proportion of 2 to 30 mass %, preferably 5 to 26 mass %, and more preferably 10 to 20 mass % in 100 wet mass % of the dough of the present disclosure. The carbohydrate includes the starches described above, dietary fiber, and sugar. The proportion of the carbohydrate in the dough of the present disclosure (mass %) can be calculated from the proportion of the remainder determined by subtracting the measured values (mass) of protein (combustion method), lipids (acid digestion), ash (ashing with magnesium acetate), and water (ambient pressure heat-drying) determined according to official methods from the measured value (wet mass) of the dough of the present disclosure.

(c) Leavening Agent

The leavening agent is a substance that has functionality of facilitating or assisting expansion of the dough of the present disclosure, which contains the raw materials described above and water, when the leavening agent is added to the dough. The leavening agent can be used to allow the dough of the present disclosure to expand. Such expansion includes expansion due to fermentation and expansion by heat treatment. The leavening agent includes, but is not limited to, yeast (e.g., fresh yeast, dry yeast, and instant dry yeast), koji mold (*Aspergillus oryzae*), baking powder, baking soda, and ispata. The leavening agent is preferably yeast or baking powder.

The proportion of the leavening agent in the dough of the present disclosure is not particularly limited as long as the effects described above are brought about. To expand the dough of the present disclosure, although not limited, the leavening agent content may be 0.05 to 5 mass %, preferably 0.2 to 2.5 mass %, and more preferably 0.5 to 1.5 mass % in 100 wet mass % of the dough.

(d) Water

The water content in the dough of the present disclosure is not particularly limited as long as the effects of the present disclosure are brought about. Although not limited, the water content in 100 wet mass % of the dough of the present disclosure is 30 to 70 mass %, preferably 40 to 60 mass %, and more preferably 45 to 55 mass %. The water content in the dough of the present disclosure can be measured according to ambient pressure heat-drying in accordance with an official method. The water for use in the production of the dough of the present disclosure is not particularly limited as long as the water is for use in food production. Any beverage or liquid containing water, such as tea drinks, fruit juice drinks, coffee drinks, nutritional drinks, and soft drinks, may be used, as long as the beverage or liquid does not interfere with the effects of the present invention and contains water.

(e) Thickening

The dough of the present disclosure may optionally contain a thickener in addition to the ingredients described above. Adding a thickener makes the texture of the produced expanded food more fluffy and elastic.

The thickener includes, but is not limited to, polysaccharide thickeners (e.g., guar gum, xanthan gum, tamarind seed gum, carrageenan, agar, pectin, gum arabic, pullulan, soy polysaccharides, gellan gum, welan gum, locust bean gum, sodium alginate, arabinoxylan, curdlan, gum karaya, glucomannan, *psyllium* seed gum, gelatin, tara gum, hydroxymethyl cellulose, hydroxypropyl cellulose, and carboxymethyl cellulose); plant-derived ingredients such as yamatoimo (Japanese yam); and cheese such as natural cheese (e.g., cream cheese, mozzarella cheese, and cottage cheese) and processed cheese. These may be used singly or in a combination of two or more.

The proportion of the thickener in the dough of the present disclosure is not particularly limited as long as the effects are brought about. Although not limited, the thickener is present in a proportion of 0 to 30 mass %, preferably 0.5 to 20 mass %, and more preferably 1 to 15 mass % based on the wet mass of the dough of the present disclosure taken as 100 mass %.

(f) Other Ingredients

The dough of the present disclosure may be composed of only the milk protein, starch, leavening agent, and water described above, or of only the milk protein, starch, leavening agent, water, and thickener described above. The dough of the present disclosure may contain ingredients as desired in addition to the ingredients above, as long as the ingredients do not interfere with the effects of the present invention. Even if the dough of the present disclosure contains such ingredients, it is preferred that the dough does not substantially contain wheat-derived protein.

Examples of such ingredients include dough starters (e.g., home-grown dough starter, ready-made dough starter, sake starter, levain starter, panettone starter, yogurt starter, and sourdough starter), yeast food (e.g., inorganic, organic, or enzyme-based dough improvers or bread improvers), fats and oils (e.g., shortening, lard, margarine, butter, liquid oil, and powdered oil), sugar (e.g., trehalose, glucose, fructose, lactose, sucrose, maltose, and isomaltose), sugar alcohol (e.g., sorbitol, maltitol, palatinit, and reduced syrup), emulsifiers (e.g., lecithin, sucrose fatty acid esters, and glycerol fatty acid esters), enzymes, seasonings (e.g., salt, amino acids, and nucleic acids), preservatives, proteins other than milk protein, amino acids (e.g., glycine, and glutamic acid), and flavoring agents. Eggs or egg products may also be used as a ingredient, but may not be used. These ingredients may be added singly or in a combination of two or more. If these ingredients are added, the proportion of the ingredients in 100 wet mass % of the dough of the present disclosure may be 0.1 to 55 mass %.

It is also preferred that the dough of the present disclosure and the expanded food produced from the dough do not substantially contain a wheat-derived protein, but also do not substantially contain a processed rice product. The processed rice product refers to an edible raw material prepared by processing rice (uruchimai (non-glutinous rice) and mochigome (glutinous rice)) as a raw material. Examples include rice flour, rice starch, and rice protein. The phrase "does not substantially contain a processed rice product" means that a processed rice product is not contained at all, or that the total content of the processed rice product in 100 wet mass % of the dough of the present disclosure is less than 0.1 mass % even if the processed rice product is contained.

The dough of the present disclosure is used as dough for producing the expanded food of the present disclosure. The method for producing the expanded food of the present disclosure by using the dough of the present disclosure includes, for example, mixing the aforementioned ingredients such as the milk protein, starch, leavening agent, and water described above (or the milk protein, starch, leavening agent, water, and thickener described above), optionally with the ingredients to prepare dough, and subjecting the dough to a primary fermentation step, a shaping step, a dividing step, a secondary fermentation step, and a heat treatment step according to a common bread-making method. Additionally, a known bread-making method may be used instead of (or in addition to) a common bread-making method. For example, the bread-making methods such as a quick-forming method, a straight dough method, a preferment method (nakadane method), a poolish method (ekidane method), a sourdough method, a sakatane (Japanese sake) dough method, a hop dough method, a chumen method, a Chorleywood method, a continuous bread-making method, an overnight method, and a remix method can be selected and used as appropriate. These methods may optionally be used in combination of two, or three or more.

The heat treatment step is performed by baking, steaming, baking and steaming, or deep-frying, depending on the type of the expanded food to be produced. The heat treatment step is preferably the baking step used for making bakery products, and more preferably the baking step used for making bread. For each operation and its conditions, the operation and conditions used in usual bread-making steps are used. However, if the dough of the present disclosure does not substantially contain gluten, it is sufficient if the raw materials are stirred and mixed in the dough-making process, and the kneading step can be omitted. In normal bread-making, dough is divided and then allowed to rest for 15 to 20 minutes (a bench or an intermediate roasting furnace) before shaping in order to allow the dough to rest after it becomes difficult to stretch due to the elasticity of gluten. However, using dough that does not substantially contain gluten as the dough of the present disclosure eliminates the need for this step. Thus, dough that does not substantially contain gluten can be used as the dough of the present disclosure to produce a bread-like expanded food with a pore structure (sudachi) and a support matrix structure, in a shorter time than it normally takes to produce regular bread.

It is preferred that the expanded food of the present disclosure does not substantially contain a wheat-derived protein, but also does not substantially contain processed products of barley, rye, and/or oats (cereal flour and starch), which are gluten-containing grain just like wheat, and proteins derived from such gluten-containing grain. Under regulations of The European Commission (No. 828/2014, published on Jul. 30, 2014), a food for sale to the final consumers (final food) with a gluten content of less than 100 mg/kg (less than 100 ppm) can be labeled a "very-low-gluten food," and a food with a gluten content of less than 20 mg/kg (less than 20 ppm) can be labeled a "gluten-free food." Under regulations of the U.S. Food and Drug Administration (FDA), an ingredient that is a gluten-containing grain (e.g., spelt wheat), an ingredient derived from a gluten-containing grain that has not been processed to remove gluten (e.g., wheat flour), and an ingredient derived from a gluten-containing grain that has been processed to remove gluten, but results in the final food containing gluten in an amount of less than 20 ppm (e.g., wheat starch), may be labeled a "gluten-free food." Thus, it is preferred to adjust the content of a processed gluten-containing grain product and the content of the protein derived from the processed gluten-containing grain product such that the gluten content (equivalent to the gluten content in 100 mass % of the solid content of the dough of the present disclosure) in the expanded food of the present disclosure is preferably less than 100 ppm, more preferably less than 20 ppm, and still more preferably 10 ppm or less. The gluten content in the expanded food of the present disclosure can be determined by ELISA using an assay kit, such as RIDASCREEN Gliadin (R-Biopharm AG), for example.

The following are examples of the protein content, the carbohydrate content, and the lipid content in the expanded food of the present disclosure:

Protein content: 10 to 30 or 10 to 31 mass %, preferably 12.8 to 28.4 mass %, more preferably 15 to 26 mass %, Carbohydrate content: 5 to 30 or 5 to 31 mass %, preferably 7 to 27 mass %, more preferably 10 to 21 mass %, Lipid content: 0.1 to 20 mass %, preferably 0.5 to 15 mass %, more preferably 1 to 12 mass %.

In the present specification, the terms "comprising," "containing," and "including" include the meanings of "consisting of" and "consisting essentially of."

EXAMPLES

The present invention will be described below with reference to the following Examples and Experimental Examples in order to aid in understanding the structure and effects of the invention. However, the invention is not limited in any way by these Examples. The following experiments were conducted at room temperature (25±5° C.)

under atmospheric pressure unless otherwise noted. Unless otherwise noted, "%" and "parts" stated below respectively mean "mass %" and "parts by mass."

The raw materials used in the following experiments are as follows.

Fermented milk for raw material: Prepared by mixing 15.71 g of skimmed milk powder (manufactured by Meiji Co., Ltd.), 3.0 g of yogurt (Meiji Probio Yogurt R-1 Plain: manufactured by Meiji Co., Ltd.), and 81.29 g of water. The fat content was 0.2%, and the protein content was 5.4% in the total amount (100%).

Milk beverage for raw material: Prepared by mixing 13.9 g of skimmed milk powder (manufactured by Meiji Co., Ltd.), 13.53 g of dairy cream (manufactured by Meiji Co., Ltd.), and 72.57 g of water. The fat content was 7%, and the protein content was 7.2% in the total amount (100%).

Unsalted butter: Meiji Hokkaido Butter (no salt added) (manufactured by Meiji Co., Ltd.). The fat content was 82.6%, and the protein content was 0.5% in the total amount (100%).

Sugar: Nitten HA (manufactured by Nippon Beet Sugar Manufacturing Co., Ltd.

Milk protein concentrate: trade name: YO-8236 (manufactured by Arla Foods Ingredients). The fat content was 5% fat, and the protein content was 82% in the total amount (100%).

Micellar casein: Trade name MCC85 (Premium) (manufactured by Sachsenmilch). The fat content was 1.5%, and the protein content was 81.1% in the total amount (100%).

Whey Protein Isolate (WPI): WPI895 (manufactured by Fonterra). The fat content was 0.1%, and the protein content was 91.9% in the total amount (100%).

Starch: Waxy Starch Y (manufactured by Nihon Shokuhin Kako Co. Ltd.)

Processed starch: Waxy Alpha S-1 (manufactured by Sanwa Starch Co., Ltd.).

Powdered soybean protein: SP6000H (manufactured by The Nisshin OilliO Group, Ltd., Inc.).

Rice flour: Riz Farine (manufactured by Gunma Rice Flour Milling Co. Ltd.)

Bakery yeast: Saf-instant dry yeast (manufactured by Lesaffre)

Experimental Example 1: Dough Composition for Expanded Food and Production of Expanded Food Bread-like foods were made as expanded foods according to the formulas and production steps listed in Tables 1-1 and 1-2 (Examples 1 to 10). Bread was also made according to the formulas and production steps listed in Table 2 (Comparative Examples 1 to 3). Each step was performed according to the standard bread-making method. The mixing step (kneading step) was performed at 25° C.

TABLE 1-1

| | | | | | | | (Mass %) |
|---|---|---|---|---|---|---|---|
| Formula of Bread-like Food (Gluten-free) | | | | | | | |
| | Example 1 | Example 2 | Example 3 | Example 4 | Example 5 | Example 6 | Example 7 |
| Fermented Milk for Raw Material | 49.80 | | 55.80 | 49.80 | 55.80 | | 55.80 |
| Milk Beverage for Raw Material | | 45.80 | | | | | |
| Cream Cheese | 15.00 | 15.00 | | 15.00 | | | |
| Unsalted Butter | | 4.00 | 9.00 | | 9.00 | | 9.00 |

TABLE 1-1-continued

| | | | | | | | |
|---|---|---|---|---|---|---|---|
| Sugar | 5.00 | 5.00 | 5.00 | 5.00 | 5.00 | 5.00 | 5.00 |
| Salt | 0.50 | 0.50 | 0.50 | 0.50 | 0.50 | 0.50 | 0.50 |
| Milk Protein Concentrate | 6.00 | 6.00 | 19.00 | 6.00 | 6.00 | 6.00 | 3.00 |
| Micellar Casein | 13.00 | 13.00 | | 13.00 | 13.00 | 13.00 | 13.00 |
| WPI | | | | | | | 3.00 |
| Starch | 10.00 | 10.00 | 10.00 | 10.00 | | 10.00 | 10.00 |
| Processed Starch | | | | | 10.00 | | |
| Bakery Yeast | 0.70 | 0.70 | 0.70 | 0.70 | 0.70 | 0.70 | 0.70 |
| Ingredient water | | | | | | 64.8 | |
| | | | | | | | |
| Total Amount | 100.000 | 100.000 | 100.000 | 100.000 | 100.000 | 100.000 | 100.000 |
| Wheat-derived Protein Content | 0.00 | 0.00 | 0.00 | 0.00 | 0.00 | 0.00 | 0.00 |
| Milk Protein Content (Protein Content Derived from Fermented Milk) | 19.166 (2.667) | 20.269 (0) | 18.497 (2.989) | 19.166 (2.667) | 18.497 (2.989) | 20.347 (0) | 18.794 (2.989) |
| Carbohydrate Content | 18.800 | 20.548 | 19.305 | 18.800 | 19.225 | 17.493 | 19.191 |
| Lipid Content | 8.831 | 8.941 | 8.027 | 8.831 | 8.087 | 0.668 | 7.880 |
| Ash Content | 2.411 | 4.177 | 2.410 | 2.411 | 2.400 | 2.038 | 2.389 |
| Water Content | 50.792 | 46.066 | 51.761 | 50.792 | 51.791 | 59.454 | 51.746 |
| | | | | | | | |
| Total Amount | 100.000 | 100.000 | 100.000 | 100.000 | 100.000 | 100.000 | 100.000 |
| Percentage of Milk Protein in Total Protein Content (%) | 99.948 | 99.951 | 99.946 | 99.948 | 99.946 | 99.936 | 99.947 |
| Percentage of Protein Derived from Fermented Milk in Total Protein Content (%) | 13.909 | 0.000 | 16.149 | 13.909 | 16.149 | 0.000 | 15.894 |

Making Process

| | | | | |
|---|---|---|---|---|
| Mixing (Using Mixer) | (1) Mixing powdery raw materials with fermented milk for raw material → Mixing for 2 minutes (2) Adding cream cheese → Mixing for 1 minute | (1) Mixing powdery raw materials with milk beverage for raw material → Mixing for 2 minutes (2) Adding unsalted butter and cream cheese → Mixing for 1 minute | (1) Mixing powdery raw materials with fermented milk for raw material → Mixing for 2 minutes (2) Adding unsalted butter → Mixing for 1 minute | (1) Mixing powdery raw materials with fermented milk for raw material → Mixing for 2 minutes (2) Adding cream cheese → Mixing for 1 minute |
| Primary Fermentation | 5° C., 75%, 16 hr | 5° C., 75%, 16 hr | 5° C., 75%, 16 hr | 5° C., 75%, 16 hr |
| Division | About 70 g × 2 | About 70 g × 2 | About 70 g × 2 | About 70 g × 2 |
| Bench Time | Not Performed | Not Performed | Not Performed | 20 Minutes |
| Shaping* | Round (Diameter: 5 cm) | Round (Diameter: 5 cm) | Round (Diameter: 5 cm) | Round (Diameter: 5 cm) |
| Final Proof | 40° C., 85%, 60 Minutes | 40° C., 85%, 60 Minutes | 40° C., 85%, 60 Minutes | 40° C., 85%, 60 Minutes |
| Baking (Top Heat/Bottom Heat, Time) | 160° C./160° C., 25 Minutes | 160° C./160° C., 25 Minutes | 160° C./160° C., 25 Minutes | 160° C./160° C., 25 Minutes |

Making Process

| | | | |
|---|---|---|---|
| Mixing (Using Mixer) | (1) Mixing powdery raw materials with fermented milk for raw material → Mixing for 2 minutes (2) Adding unsalted butter → Mixing for 1 minute | (1) Mixing powdery raw materials with water → Mixing for 2 minutes (2) Adding cream cheese → Mixing for 1 minute | (1) Mixing powdery raw materials with fermented milk for raw material → Mixing for 2 minutes (2) Adding unsalted butter → Mixing tor 1 minute |
| Primary Fermentation | 5° C., 75%, 16 hr | 5° C., 75%, 16 hr | 5° C., 75%, 16 hr |
| Division | About 70 g × 2 | About 70 g × 2 | About 70 g × 2 |
| Bench Time | Not Performed | Not Performed | Not Performed |
| Shaping* | Round (Diameter: 5 cm) | Round (Diameter: 5 cm) | Round (Diameter: 5 cm) |
| Final Proof | 40° C., 85%, 60 Minutes | 40° C., 85%, 60 Minutes | 40° C., 85%, 60 Minutes |
| Baking (Top Heat/Bottom Heat, Time) | 160° C./160° C., 25 Minutes | 160° C./160° C., 25 Minutes | 160° C./160° C., 25 Minutes |

*Two pieces of dough formed into a round shape were placed in a bread-baking container (5 cm long × 10 cm wide × 5 cm high), fermented to rise, and baked

TABLE 1-2

| Formula of Bread-like Food (Gluten-free) | | | |
| --- | --- | --- | --- |
| | | | (Mass %) |
| | Example 8 | Example 9 | Example 10 |
| Fermented Milk for Raw Material | | | 44.51 |
| Milk Beverage for Raw Material | 49.90 | 50.35 | |
| Cream Cheese | 15.00 | 15.00 | |
| Unsalted Butter | | | 7.80 |
| Sugar | 5.00 | 5.00 | 5.00 |
| Salt | 0.50 | 0.50 | 0.79 |
| Milk Protein Concentrate | 5.00 | 4.30 | 19.76 |
| Micellar Casein | 12.00 | 9.65 | |
| WPI | | | |
| Starch | 10.00 | 10.00 | |
| Processed Starch | | | |
| Bakery Yeast | 0.70 | 0.70 | 0.40 |
| Rice Flour | | | 19.76 |
| Powdered Soy Protein | 1.90 | 4.50 | |
| Cow Milk | | | 1.98 |
| Ingredient water | | 0.00 | 0.00 |
| Total Amount | 100.000 | 100.000 | 100.000 |
| Wheat-derived Protein Content | 0.00 | 0.00 | 0.00 |
| Milk Protein Content | 17.54 | 15.08 | 18.2 |
| (Protein Content Derived from Fermented Milk) | (0) | (0) | (2.38) |
| Carbohydrate Content | 18.75 | 18.65 | 25.11 |
| Lipid Content | 8.63 | 8.60 | 10.36 |
| Ash Content | 4.10 | 6.40 | 3.49 |
| Water Content | 50.98 | 51.28 | 42.84 |
| Total Amount | 100.00 | 100.00 | 100.00 |
| Percentage of Milk Protein in Total Protein Content (%) | 90.76 | 78.15 | 93.57 |
| Percentage of Protein Derived from Fermented Milk in Total Protein Content (%) | 0.00 | 0.00 | 12.26 |

| Making Process | | | |
| --- | --- | --- | --- |
| Mixing (Using Mixer) | (1) Mixing powdery raw materials with milk beverage for raw material → Mixing for 2 minutes (2) Adding cream cheese →Mixing for 1 minute | (1) Mixing powdery raw materials with milk beverage for raw material → Mixing for 2 minutes (2) Adding cream cheese →Mixing for 1 minute | (1) Mixing powdery raw materials with fermented milk for raw material → Mixing for 2 minutes (2) Adding unsalted butter →Mixing for 1 minute |
| Primary Fermentation | 5° C., 75%, 16 hr | 5° C., 75%, 16 hr | 30° C., 2 hr |
| Division | About 70 g × 2 | About 70 g × 2 | About 70 g × 2 |
| Bench Time | Not Performed | Not Performed | Not Performed |
| Shaping* | Round (Diameter: 5 cm) | Round (Diameter: 5 cm) | Round (Diameter: 5 cm) |
| Final Proof | 40° C., 85%, 60 Minutes | 40° C., 85%, 60 Minutes | 40° C., 85%, 60 Minutes |
| Baking (Top Heat/Bottom Heat, Time) | 160° C./160° C., 25 Minutes | 160° C./160° C., 25 Minutes | 160° C./160° C., 17 Minutes |

*Examples 8-10: Two pieces of dough formed into a round shape were placed in a bread-baking container (5 cm long × 10 cm wide × 5 cm high), fermented to rise, and baked.

TABLE 2

| Formula of Bread (Wheat Added) | | | |
| --- | --- | --- | --- |
| | | | (Mass %) |
| | Comparative Example 1 | Comparative Example 2 | Comparative Example 3 |
| Hard Flour (Grade 1) | 48.30 | 48.30 | 48.30 |
| Fermented Milk for Raw Material | 0.00 | 15.00 | 30.00 |
| Unsalted Butter | 10.90 | 10.90 | 10.90 |
| Sugar | 4.90 | 4.90 | 4.90 |
| Salt | 0.40 | 0.40 | 0.40 |
| Bakery Yeast | 0.70 | 0.70 | 0.70 |
| Ingredient water | 34.80 | 19.80 | 4.80 |

TABLE 2-continued

| Formula of Bread (Wheat Added) | | | |
|---|---|---|---|
| Total Amount | 100.000 | 100.000 | 100.000 |
| Wheat-derived Protein Content | 5.70 | 5.70 | 5.70 |
| Milk Protein Content | 0.05 | 0.58 | 1.10 |
| Carbohydrate Content | 39.93 | 40.72 | 41.51 |
| Lipid Content | 9.03 | 9.04 | 9.06 |
| Ash Content | 1.17 | 1.29 | 1.41 |
| Water Content | 44.12 | 42.68 | 41.23 |
| Total Amount | 100.00 | 100.00 | 100.00 |
| Percentage of Milk Protein in Total Protein Content (%) | 0.82 | 8.72 | 15.46 |

| Making Process | | | |
|---|---|---|---|
| Mixing (Using Mixer) | (1) Mixing powdery raw materials with water → Mixing for 10 minutes (kneaded until gluten forms) (2) Adding unsalted butter → Mixing for 6 minutes (kneaded until butter is mixed) | (1) Mixing powdery raw materials with water → Mixing for 10 minutes (kneaded until gluten forms) (2) Adding unsalted butter → Mixing for 6 minutes (kneaded until butter is mixed) | (1) Mixing powdery raw materials with water → Mixing for 10 minutes (kneaded until gluten forms) (2) Adding unsalted butter → Mixing for 6 minutes (kneaded until butter is mixed) |
| Primary Fermentation | 5° C., 75%, 16 hr | 5° C., 75%, 16 hr | 5° C., 75%, 16 hr |
| Bench Time | 20 Minutes | 20 Minutes | 20 Minutes |
| Division | About 50 g × 2 | About 50 g × 2 | About 50 g × 2 |
| Shaping | Round (Diameter: 5 cm) | Round (Diameter: 5 cm) | Round (Diameter: 5 cm) |
| Final Proof | 40° C., 85%, 60 Minutes | 40° C., 85%, 60 Minutes | 40° C., 85%, 60 Minutes |
| Baking (Top Heat/Bottom Heat, Time) | 190° C./190° C., 35 Minutes | 190° C./190° C., 35 Minutes | 190° C./190° C., 35 Minutes |

*Two pieces of dough formed into a round shape were placed in a bread-baking container (5 cm long × 10 cm wide × 5 cm high), fermented to rise, and baked.

The results indicate that the expanded foods (bread-like food) in Examples 1 to 10, just like the bread in Comparative Examples 1 to 3, all had a network formed of baked proteins, carbohydrates, etc. (mesh-like solid region), thus having a pore structure similar to that of bread called "sudachi" (support matrix formation). As shown in Table 1-2, Examples 8 and 9, in which the milk protein content was respectively set to 90 mass % and 80 mass % of the total protein content, and Example 10, in which rice flour was added, all resulted in an expanded food with a pore structure similar to that of bread as in Examples 1 to 7.

Figure 1:
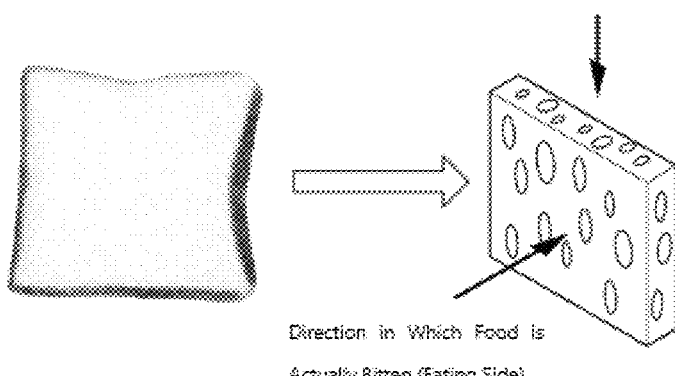
FIG. 1 (1): An illustration of the eating side and vertical side of an expanded food.
Figure 1:
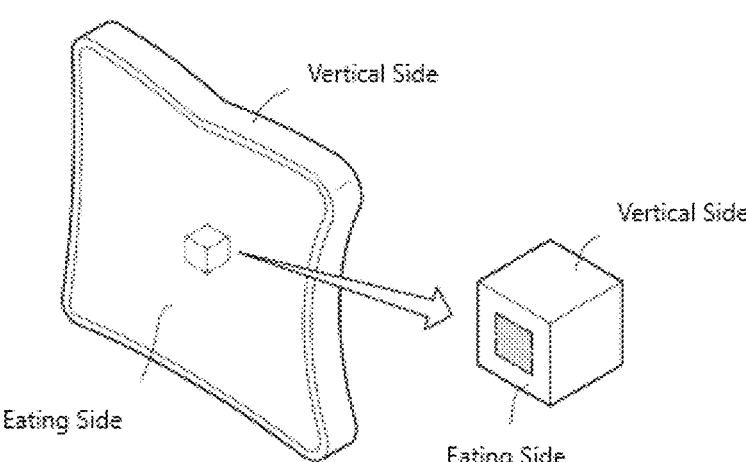
Figure 2:
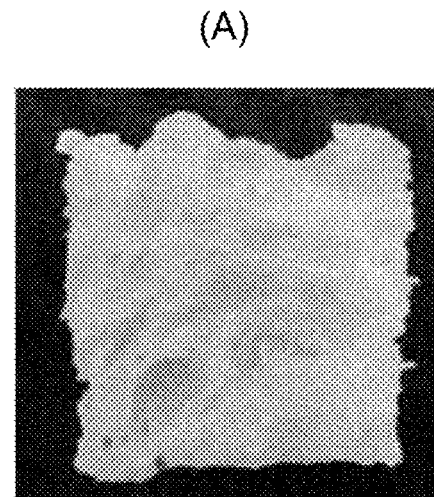
FIG. 2: Images of (A) the eating side and (B) the vertical side of the internal cross-section of the bread-like food in Example 1.
Figure 2:
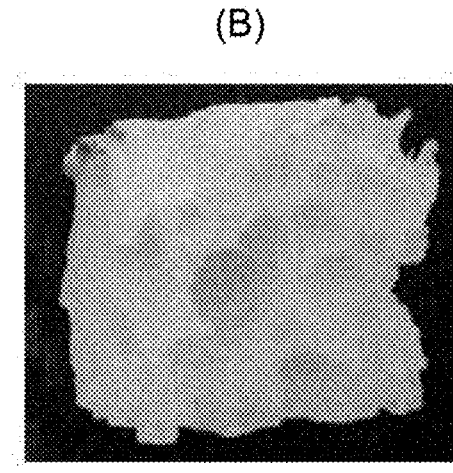

FIGS. 2 to 11 show images of the internal cross-section ((a) eating side, and (b) vertical side) of the bread-like foods of Examples 1 to 10. The eating side is the surface at which shokupan [Japanese soft white bread baked in a square pan]

is actually bitten (the surface against which teeth hit), and the vertical side is the surface in the direction perpendicular to the eating side (see FIG. 1(1)). The "internal" indicates the portion that is not the surface of each expanded food and that is not the hardened portion of the surface layer (the "crust" in the case of shokupan). A cube of 2 cm per side was cut out from the center of each expanded food, including center portion as a test specimen (see FIG. 1(2)).

FIGS. 12 to 14 show images of the internal cross-section of the bread of Comparative Examples 1 to 3 ((A) eating side, and (B) vertical side), and FIGS. 15 to 19 show images of the internal cross-section of commercially available bread (shokupan) A to E made mostly of wheat flour ((A) eating side, and (B) vertical side) (six-slice bread, 2-cm thick). Table 3 shows the nutrient content and ingredients label of commercially available bread A to E.

TABLE 3

| | | Commercially Available Bread (Shokupan) | | | | |
|---|---|---|---|---|---|---|
| | | Comparative Example 4 Commercially Available Bread A | Comparative Example 5 Commercially Available Bread B | Comparative Example 6 Commercially Available Bread C | Comparative Example 7 Commercially Available Bread D | Comparative Example 8 Commercially Available Bread E |
| Percentage | Calorie (kcal) | 266 | 278 | 264 | 258 | 254 |
| of | Protein (g) | 7.9 | 8.3 | 9.2 | 8.8 | 8.9 |
| Nutritional | Lipid (g) | 4.2 | 4.8 | 5.4 | 2.9 | 3.9 |
| Ingredient in | Carbohydrate (g) | 49.1 | 51.8 | 44.6 | 49.1 | 45.9 |
| 100 g of | Salt-equivalent | 1.1 | 1.1 | 1.2 | 1.3 | 1.1 |
| Bread | Amount (g) | | | | | |

TABLE 3-continued

| | Commercially Available Bread (Shokupan) | | | | |
| --- | --- | --- | --- | --- | --- |
| | Comparative Example 4 Commercially Available Bread A | Comparative Example 5 Commercially Available Bread B | Comparative Example 6 Commercially Available Bread C | Comparative Example 7 Commercially Available Bread D | Comparative Example 8 Commercially Available Bread E |
| Carbohydrate Content (%) in Bread Dough before Baking (100 Mass %)* | 47.9 | 50.5 | 43.4 | 47.9 | 44.8 |
| Ingredients Label | Wheat (Milled in Japan), Sugar, Margarine Containing Butter, Bakery Yeast, Salt, Rice Flour, Fermented Vinegar (Containing some wheat and milk ingredients) | Wheat (Milled in Japan), Sugar, Cream (Dairy Product), Butter, Dough Starter, Bakery Yeast, Skimmed Milk Powder, Salt (Containing some milk ingredients, wheat, and soybeans) | Wheat (Milled in Japan), Sugars, Shortening, Bakery Yeast, Margarine, Egg, Skimmed Milk Powder, Salt, Natural Cheese, Cow Milk, Dough Starter, Vegetable Fat and Oil, Whey Mineral/Emulsifier, Yeast Food, Flavoring Agent, V.C (Containing some milk ingredients, egg, wheat, and soybeans) | Wheat, Sugar, Margarine Containing Butter, Skimmed Milk Powder, Salt, Shortening, Bakery Yeast, Fermentation Flavoring Agent/Vitamin C (Containing some milk ingredients and wheat) | Wheat, Sugars, Margarine, Butter, Bakery Yeast, Salt, Dough Starter, Skimmed Milk Powder/Emulsifier, Yeast Food, V.C (Containing some milk ingredients, wheat, and soybeans) |

*The moisture lost from dough during baking is 2 to 3 mass %. Thus, calculation is based on the assumption that the moisture content in dough before baking is the moisture content of bread plus 2.5 mass %.

As shown in FIGS. 2 to 19, the pore structure of the bread-like foods in Examples 1 to 10 was clearly different from the pore structure of the wheat bread in Comparative Examples 1 to 8, specifically in terms of the size and shape of the pore structure. In the pore structure of the bread-like foods in Examples 1 to 10, each air bubble was large, and there was no clear trend of extension in the vertical direction in the eating side. However, in the pore structure of the wheat bread in Comparative Examples 1 to 8, each air bubble was small, and the tendency of extension in the vertical direction in the eating side was clear, with multiple vertically elongated air bubbles present.

Additionally, in the bread-like foods in Examples 1 to 10, the solid regions formed from the dough had a simpler shape and a rougher mesh-like structure, with the average thickness being large, and the thickness of the solid regions was uneven, varying greatly from site to site. The bread-like foods had a dynamic structure with large voids.

Experimental Example 2: Structure Evaluation of Expanded Food

The internal structure of the bread-like foods (Examples 1 to 10) and bread (Comparative Examples 1 to 3) produced in Experimental Example 1 and the internal structure of commercially available bread A to E (Comparative Examples 4 to 8), listed in Table 3, were analyzed with image analysis software.

Specifically, a sample, which was a cube of 1 cm per side cut out from the inside of each food, was photographed with an X-ray computed tomography scanner (nano3DX: Rigaku Corporation) in a horizontal direction with relative to the eating side (1-cm² square) to obtain an image of a 1-cm² square. For the images, an area of 1 cm from the eating side in the vertical direction was photographed in 800 shots. The 800 images were restored to a 1-cm³ cube using image analysis software (Dragonfly: Maxnet Co., Ltd.), and the central 5-mm cube portion was analyzed with image analysis software (Dragonfly: Maxnet Co., Ltd.). Detailed procedures and conditions are shown below.

(1) X-Ray µCT Imaging Conditions

Lens: L4320

X-ray source: Mo

Binning: 2

Number of shots: 800 (800 shots for 1 cm)

CT scan time: 6.6 sec/shot (2) Preparation for X-Ray Image Analysis

Imaging data are read from the X-ray computed tomography scanner. 800 images for imaging data are prepared.

X-ray luminance data are binarized based on a predetermined value taken as a threshold value.

The binarized data are displayed in "show histogram," and the higher value is defined as a solid and divided. (The lower value is defined as a void.)

The divided data are cut to an area of a square of 5 mm per side.

(3) Calculation of Specific Surface Area of Solid Region and Calculation of Specific Surface Area of Void The "volume" and "surface area (pixel-wise)" of the data cut out in section (2) are calculated.

The histogram of "volume" is divided into a few large structures and many extremely small structures. The large structures are considered to be solid regions, and "volume: unit mm³" and "surface area (pixel-wise): unit mm²" are calculated. They are respectively defined as "volume of solid region" and "surface area (pixel-wise) of solid region."

The result determined by subtracting "volume of solid region" from the volume of a cube of 5 mm per side is defined as "volume of void."

The value determined by dividing "surface area (pixel-wise): unit mm²" by "volume: unit mm³" is defined as "specific surface area: unit/mm." "Surface area (pixel-wise) of solid region/volume of solid region" is defined as "specific surface area of solid region." "Surface area (pixel-wise) of void/volume of void" is defined as "specific surface area of void."

Evaluation is performed by cutting out areas at three points from the divided data (n=3). The mean value and standard deviation are calculated for "specific surface area of solid region" and "specific surface area of void."

(4) Calculation of Solid Region Thickness of Bread-Like Food

The solid region thickness is calculated by counting the number of voxels for the data cut out in section (2) above. The "normal (sampled)" of "to a thickness mesh" is used for calculation.

A histogram for the calculated solid region thickness is displayed. The mean value on the histogram is defined as "mean value of solid region thickness: unit μm," and the standard deviation on the histogram is defined as "standard deviation of solid region thickness: unit μm." Although the phrases "mean value" and "standard deviation" are used, these are parameters of the thickness distribution in the measured region, and not parameters indicating errors between the data. Evaluation is performed with n=1 by cutting out a single portion at the center (5-mm cube) of the divided data.

Table 4 shows the results of analyzing the specific surface area of the solid regions and voids of each test sample.

TABLE 4

Specific Surface Area of Solid Region and Void

| | Specific Surface Area (Solid Region) | | Specific Surface Area (Void) | |
|---|---|---|---|---|
| | Mean Value (mm) | Standard Deviation | Mean Value (mm) | Standard Deviation |
| Example 1 | 10.57 | 0.34 | 6.20 | 0.16 |
| Example 2 | 9.63 | 0.24 | 4.84 | 0.36 |
| Example 3 | 17.10 | 0.28 | 7.85 | 0.21 |
| Example 4 | 10.52 | 1.30 | 3.77 | 0.03 |
| Example 5 | 6.64 | 0.16 | 6.60 | 0.68 |
| Example 6 | 6.05 | 0.69 | 7.62 | 3.13 |
| Example 7 | 20.36 | 1.12 | 7.15 | 1.27 |
| Example 8 | 6.53 | 0.59 | 7.92 | 1.09 |
| Example 9 | 6.81 | 0.20 | 7.36 | 1.33 |
| Example 10 | 15.06 | 0.06 | 5.54 | 0.06 |
| Comparative Example 1 | 41.22 | 1.48 | 9.89 | 0.23 |
| Comparative Example 2 | 27.34 | 0.38 | 12.04 | 0.31 |
| Comparative Example 3 | 29.76 | 2.75 | 9.59 | 1.75 |
| Comparative Example 4 (Commercially Available Bread A) | 58.35 | 1.39 | 9.27 | 1.35 |
| Comparative Example 5 (Commercially Available Bread B) | 45.15 | 1.21 | 11.71 | 1.37 |
| Comparative Example 6 (Commercially Available Bread C) | 41.84 | 1.87 | 8.32 | 0.92 |
| Comparative Example 7 (Commercially Available Bread D) | 39.34 | 2.55 | 9.89 | 0.39 |
| Comparative Example 8 (Commercially Available Bread E) | 61.49 | 0.47 | 11.69 | 0.26 |

As shown in Table 4, the specific surface area (mean value) of the solid regions was significantly smaller in the bread-like foods of Examples 1 to 11, ranging from 6.05 to 20.36/mm, compared with 27.34 to 41.22/mm of the bread of Comparative Examples 1 to 3 and 39.34 to 61.49/mm of the commercial bread of Comparative Examples 4 to 8. The specific surface area (mean value) of the voids was significantly smaller, ranging from 3.77 to 7.92/mm in the bread-like foods of Examples 1 to 11, compared with 9.59 to 12.04/mm of the bread in Comparative Examples 1 to 3 and 8.32 to 11.71/mm of the commercial bread in Comparative Examples 4 to 8. This indicates that the bread-like foods in the Examples, which had a smaller specific surface area for the solid regions, had solid regions of simpler shape and a thicker support matrix than the bread in the Comparative Examples. Additionally, the bread-like foods in the Examples, which had a smaller specific surface area for the voids, can be evaluated as having larger air bubbles than the bread in the Comparative Examples. This structural characteristics were also consistent with the trend in the results of images evaluated in Experimental Example 1.

Although not bound by theory, these structural differences may be attributed to the different types of proteins between them. Due to the viscosity and elasticity of wheat-derived gluten, dough containing wheat can stretch thinly like a balloon to catch air bubbles when it expands through fermentation etc. This results in a thin support network formed in solid regions, as well as many small air bubbles, forming an intricate stratified structure with many continuous thin solid regions. In contrast, the milk protein itself has no property of catching air bubbles to expand. Thus, the bread-like foods in the Examples are structured to catch as many air bubbles as possible that formed during the fermentation process of the production, relying on the viscosity of the dough. More specifically, the thickness of the support matrix formed in the solid regions becomes thicker, rather than thinner, because the structure is formed to catch air bubbles with a thick film of the dough. Additionally, nearby air bubbles appear to merge to increase large air bubbles, thereby forming a relatively simple stratified structure compared to the structure of wheat-derived bread.

Table 5 shows the results of analyzing the solid region thickness of each test sample.

TABLE 5

Solid Region Thickness

| | Mean Value (μm) of Solid Region Thickness | Standard Deviation of Solid Region Thickness |
|---|---|---|
| Example 1 | 333.9 | 152.3 |
| Example 2 | 356.3 | 170.0 |
| Example 3 | 218.3 | 96.5 |
| Example 4 | 310.0 | 144.9 |
| Example 5 | 431.8 | 218.6 |
| Example 6 | 437.5 | 198.8 |
| Example 7 | 197.0 | 83.1 |
| Example 8 | 425.5 | 200.7 |
| Example 9 | 421.7 | 189.5 |
| Example 10 | 243.2 | 107.9 |
| Comparative Example 1 | 119.2 | 42.9 |
| Comparative Example 2 | 153.1 | 72.0 |
| Comparative Example 3 | 151.5 | 69.2 |
| Comparative Example 4 (Commercially Available Bread A) | 102.0 | 37.0 |
| Comparative Example 5 (Commercially Available Bread B) | 112.9 | 35.7 |
| Comparative Example 6 (Commercially Available Bread C) | 120.9 | 45.7 |
| Comparative Example 7 (Commercially Available Bread D) | 125.9 | 52.0 |
| Comparative Example 8 (Commercially Available Bread E) | 98.6 | 29.6 |

As shown in Table 5, the mean value of the solid region thickness was significantly greater in the bread-like foods in Examples 1 to 10, ranging from 197.0 to 437.5 μm, compared with 119.2 to 153.1 μm in the bread of Comparative Examples 1 to 3 and 98.6 to 125.9 μm in the commercial bread of Comparative Examples 4 to 8. The standard deviation of the solid region thickness was significantly greater in the bread-like foods of Examples 1 to 10, ranging from 83.1 to 218.6 µm, compared with 42.9 to 72.0 µm in the bread of Comparative Examples 1 to 3 and 29.6 to 52.0 µm in the commercial bread of Comparative Examples 4 to 8. From these results, the bread-like foods in the Examples, which had a greater mean value for the solid region thickness and a greater standard deviation therefor, are evaluated as having a non-uniform solid region thickness and solid regions of different thickness as compared with the bread in the Comparative Examples. These structural characteristics were also consistent with the trend in the results of images evaluated in Experimental Example 1.

Experimental Example 3: Texture Evaluation of Expanded Food

The bread-like foods (Examples 1 to 10) and bread (Comparative Examples 1 to 3) made in Experimental Example 1 and commercially available bread A to E (Comparative Examples 4 to 8) listed in Table 3 ("test foods" below) were eaten by a panel of experienced evaluators. The panel evaluated the texture, specifically "hardness at the start of mastication," "stickiness developing during mastication in the mouth," and "ease of breaking down the bolus during mastication in the mouth. These textures correspond to the textures felt at each stage of the mastication process described below. All of the panel members were skilled evaluators who received in-house sensory evaluation training and have more than 10 years of testing experience in performing sensory evaluation tests on a daily basis in their work (sensory evaluation experts).

Expanded Food Intake Process

The intake process of expanded food consists of the mastication process and the deglutition process. The mastication process in the oral cavity can be divided into four stages: the first mastication stage, the early mastication stage, the middle mastication stage, and the late mastication stage.

First mastication stage: the stage in which food is first chewed with the teeth. In regards to the texture, this is the stage at which "hardness at the start of mastication" is felt.

Early mastication stage: this stage corresponds to the first 1/3 of the divided three stages of the period from the start of mastication of food in the oral cavity until deglutition (mastication period). This stage corresponds to the first 1/3 of the total number of mastication times from the start of mastication out of the number of mastication times required in the period from the start of mastication after food is placed in the oral cavity until deglutition ("the total number of mastication times" below). In regards to the texture, this is the stage in which air bubbles in expanded food are broken by mastication, and giving the sensation of compression (hardness).

Middle mastication stage: this stage corresponds to the period for the number of mastication times from the point of 1/3 to 2/3 of the total number of mastication times from the start of mastication. In regards to the texture, this is the stage in which adherence of the compressed bolus in the oral cavity increases as it is mixed with saliva by mastication, resulting in "stickiness" (stickiness felt in the oral cavity when food is mixed with saliva).

Late mastication stage: this stage corresponds to the period for the number of mastication times from the point of 2/3 to 3/3 of the total number of mastication times from the start of mastication. In regards to the texture, this is the stage in which decreases in hardness and adhesiveness (i.e., "ease of breaking down the bolus") are felt because the bolus absorbs saliva to increase its water content due to continued mastication of the bolus in the oral cavity.

Assuming the consumer's purchase and consumption, the test foods of Examples 1 to 10 and Comparative Examples 1 to 3 were cooled after being made, placed in a plastic bag, and allowed to stand for one day at room temperature. For commercially available bread A to E (Comparative Examples 4 to 8), products three days before their expiration date were purchased and used. Immediately before the sensory test, the crust of each test food was cut off from the four sides, and the remainder was cut to 5 cm in length and width and 1 cm in thickness (a single test specimen), and immediately used in the sensory test.

The sensory evaluation was conducted by hitting the teeth against the eating side of the test food (see FIG. 1 (1)) and chewing the test food. The amount of a morsel of the test specimen was set such that a single test specimen could be consumed in two bites. First, the panel members ate a test food, and the number of mastication times required until deglutition of a bite was measured. Second, the following evaluation was performed according to the following methods: "hardness at the start of mastication" when the same test food was again chewed with the teeth on the eating side (first mastication stage), "stickiness," which is adherence felt on the teeth or oral cavity during the period corresponding to the number of mastication times from the point of 1/3 to 2/3 of the total number of mastication times over the period from the start of mastication in the mouth until deglutition (middle mastication stage), and "ease of breaking down the bolus" felt during the period corresponding to the number of mastication times from the point of 2/3 to deglutition (at a point of 3/3 of the total number of mastication times) of the total number of mastication times (late mastication stage).

Evaluation of Hardness at the Start of Mastication

Hardness at the start of mastication was evaluated according to a scoring method (7-point scale). Specifically, standard product (1) and standard product (2) were prepared as reference samples to standardize each panel's internal standards. The "hardness at the start of mastication" of standard product (1) was set as "1" (soft) and the "hardness at the start of mastication" of standard product (2) was set as "7" (hard). The panel members were asked to score the hardness at the start of mastication of each test food as compared with standard products (1) and (2). The criteria for "score 1" and "score 7" were discussed among the panel members beforehand to avoid any inconsistency in judging criteria among them. Standard product (1) was bread with the same formula as the bread of Comparative Example 1 and was made by relaxing the baking conditions to 170° C. for 30 minutes. Standard product (2) was made by cutting off the crust of the four sides of standard product (1), cutting the remainder to 5 cm in length and width and 1 cm in thickness, baking it in a toaster oven for 3 minutes, and then cooling it to room temperature. The scoring method was performed based on the description on pages 186 to 187 of Kanno Hyokashi Text (edited by Japanese Society for Sensory Evaluation, 2009, Publisher: Kenpakusha). To standardize each panel's internal standards for implementing the sensory evaluation, a pre-sensory evaluation test on some expanded foods was conducted according to the method above, and the sense of "hardness at the start of mastication" was discussed (trial evaluation and calibration) among the panel members to ensure that the panel members had a common understanding. This evaluation was conducted on a blind-study basis so that each test food was unknown.

Evaluation of Stickiness

Stickiness was evaluated according to a ranking method (7 scales). Specifically, the panel members ate each test food, arranged them in order in which they felt the sense of "stickiness," and further categorized them into 7 scales (1: no sense of stickiness or lowest level of stickiness, 7: highest level of stickiness). To standardize each panel's internal standards for implementing the sensory evaluation, a pre-sensory evaluation test on some expanded foods was conducted according to the method above, and the sense of "stickiness" was discussed (trial evaluation and calibration) among the panel members to ensure that the panel members had a common understanding. This evaluation was conducted on a blind-study basis so that each test food was unknown.

Evaluation of Ease of Breaking Down Food Bolus

The ease of breaking down the bolus was evaluated according to a ranking method (7 levels). Specifically, the panel members ate each test food, arranged them in order of "ease of breaking down the bolus," and further categorized them into seven levels (1: hardest to break down the bolus, 7: easiest to break down the bolus). To standardize each panel's internal standards for implementing the sensory evaluation, a pre-sensory test on some expanded foods was conducted according to the method above, and the sense of "ease of breaking down the bolus" was discussed (trial evaluation and calibration) among the panel members to ensure that the panel members had a common understanding. This evaluation was conducted on a blind-study basis so that each test food was unknown.

Tables 6 to 8 show the results. Examples 1 to 3 and Comparative Examples 1 and 4 were conducted by three panel members, and their average and standard deviation are shown. The other Examples and Comparative Examples were conducted by one of the three panel members, an expert of the sensory evaluation test on behalf of the panel.

TABLE 6

| (Hardness at the Start of Mastication) | | | | | | | | | |
| Example | | | | | | | | | |
| | 1 | 2 | 3 | 4 | 5 | 6 | 7 | 8 | 9 | 10 |
| Score | 2.3 | 1.3 | 4.3 | 5 | 3 | 3 | 5 | 2.5 | 3.5 | 2 |
| Standard Deviation | 0.6 | 0.6 | 0.6 | — | — | — | — | — | — | — |

| | Comparative Example | | | | | | | |
| | 1 | 2 | 3 | 4 | 5 | 6 | 7 | 8 |
| Score | 2.3 | 3 | 4 | 1.3 | 1 | 2 | 3 | 2 |
| Standard Deviation | 0.6 | — | — | 0.6 | — | — | — | — |

TABLE 7

| (Stickiness) | | | | | | | | | |
| Example | | | | | | | | | |
| | 1 | 2 | 3 | 4 | 5 | 6 | 7 | 8 | 9 | 10 |
| Score | 1.3 | 2 | 2.3 | 2 | 4 | 3 | 1 | 4 | 4 | 1.3 |
| Standard Deviation | 0.6 | 0 | 0.6 | — | — | — | — | — | — | — |

TABLE 7-continued

| (Stickiness) | | | | | | | |
| Comparative Example | | | | | | | |
| | 1 | 2 | 3 | 4 | 5 | 6 | 7 | 8 |
| Score | 6.3 | 6 | 7 | 6.7 | 6 | 7 | 6 | 6 |
| Standard Deviation | 0.6 | — | — | 0.6 | — | — | — | — |

TABLE 8

| (Ease of Breaking Down Bolus) | | | | | | | | | |
| Example | | | | | | | | | |
| | 1 | 2 | 3 | 4 | 5 | 6 | 7 | 8 | 9 | 10 |
| Score | 6.7 | 6.7 | 5 | 6 | 5 | 6 | 5 | 5.5 | 4.5 | 6.7 |
| Standard Deviation | 0.6 | 0.6 | 1 | — | — | — | — | — | — | — |

| | Comparative Example | | | | | | | |
| | 1 | 2 | 3 | 4 | 5 | 6 | 7 | 8 |
| Score | 1.3 | 2 | 3 | 2 | 1 | 1 | 2 | 3 |
| Standard Deviation | 0.6 | — | — | 0 | — | — | — | — |

The bread-like food in the Examples had a fluffy and soft texture for hardness at the start of mastication, as did the wheat bread in the Comparative Examples. The obtained results were subjected to a test of the difference in average (t-test) between the two groups of the Examples and the Comparative Examples, and no significant difference was found. However, the sense of clinging (adhering) to the teeth and oral cavity (stickiness) in the middle mastication stage was significantly less in the bread-like foods in the Examples than in the wheat bread in the Comparative Examples. The ease of breaking down the bolus in the late mastication stage was significantly higher in the bread-like foods in the Examples than in the wheat bread in the Comparative Examples. In fact, a test of the difference in average (t-test) between the two groups of the Examples and the Comparative Examples using these results of the sensory evaluation found a significant difference (1% significance) in both the stickiness and ease of breaking down the bolus. Although the bread-like foods in the Examples were similar to regular wheat bread in terms of softness in contact with the teeth, the bread-like foods were less sticky in the oral cavity than the wheat bread, and the bolus of the bread-like foods was easy to break down in the late mastication stage, indicating that the bread-like foods have an easy-to-eat texture from both the mastication and deglutition perspectives.

As evaluated in Experimental Example 2, the bread-like foods in the Examples have a smaller specific surface area for the solid regions and a smaller specific surface area for the voids as compared with those of the wheat bread in the Comparative Examples. Thus, the bread-like foods have a smaller surface coming in contact with saliva and are less likely to absorb water when mixed with saliva during mastication (middle mastication stage), and thus can be evaluated as being less likely to become sticky. The results of evaluation of stickiness in this study reflected this fact. Additionally, as evaluated in Experimental Example 2, the bread-like foods in the Examples had a greater mean value for solid region thickness and a greater standard deviation therefor than those of the wheat bread in the Comparative Examples. Thus, due to the presence of crumbly portions regardless of the strong structure, the bolus that has been mixed with saliva and has absorbed water through multiple times of chewing is considered likely to have an easy-to-break-down texture. The results of the sensory evaluation for the ease of breaking down boluses described above reflected this fact.

The invention claimed is:

1. An expanded food comprising a milk protein in a proportion of 75 mass % or more based on the total protein, wherein the expanded food has a structure as measured with an X-ray computed tomography scanner, the structure having specific surface areas within the following ranges:

Specific Surface Areas:

(1A) Specific surface area of solid region: 6 to 22/mm; and (1B) Specific surface area of void: 3 to 8/mm;

wherein the expanded food is obtained by subjecting a dough composition comprising (a) a milk protein in a proportion of 75 mass % or more based on the total protein, (b) a starch, (c) yeast, and (d) water to a fermentation treatment and then to a heat treatment to cause the dough composition to expand and form a support matrix.

2. The expanded food according to claim 1, wherein the structure as measured with an X-ray computed tomography scanner is identified according to the following solid region thickness distribution:

Solid Region Thickness Distribution:

(2A) Mean value of solid region thickness: 180 to 450 μm; and (2B) Standard deviation of solid region thickness: 80 to 230 μm.

3. The expanded food according to claim 1, wherein the milk protein comprises a protein derived from a milk-fermented product.

4. The expanded food according to claim 1, wherein the expanded food comprises one or more edible compositions comprising the milk protein, and at least one of the edible compositions is a milk-fermented product.

5. The expanded food according to claim 1, which does not substantially comprise a wheat-derived protein.

6. The expanded food according to claim 1, wherein (b) the starch is at least one starch selected from the group consisting of a natural starch and a processed starch.

7. The expanded food according to claim 1, wherein the dough composition further comprises (e) a thickener.

8. The expanded food according to claim 1, which does not substantially comprise a processed rice product.

9. The expanded food according to claim 1, which does not comprise at least one member selected from the group consisting of an egg and an egg-derived ingredient.

10. The expanded food according to claim 1, wherein a protein content is 10 to 31 mass %, a carbohydrate content is 5 to 31 mass %, and a lipid content is 0.1 to 20 mass %.

11. The expanded food according to claim 3, wherein the milk-fermented product is fermented milk.

12. The expanded food according to claim 2, wherein the milk protein comprises a protein derived from a milk-fermented product.

13. The expanded food according to claim 12, wherein the milk-fermented product is fermented milk.

14. The expanded food according to claim 2, wherein the expanded food comprises one or more edible compositions comprising the milk protein, and at least one of the edible compositions is a milk-fermented product.

15. The expanded food according to claim 2, which does not substantially comprise a wheat-derived protein.

16. The expanded food according to claim 2, wherein (b) the starch is at least one starch selected from the group consisting of a natural starch and a processed starch.

17. The expanded food according to claim 2, wherein the dough composition further comprises (e) a thickener.

18. The expanded food according to claim 2, which does not substantially comprise a processed rice product.

19. The expanded food according to claim 2, which does not comprise at least one member selected from the group consisting of an egg and an egg-derived ingredient.

20. The expanded food according to claim 2, wherein a protein content is 10 to 31 mass %, a carbohydrate content is 5 to 31 mass %, and a lipid content is 0.1 to 20 mass %.

* * * * *